United States Patent
Shiffert et al.

(10) Patent No.: US 10,713,686 B2
(45) Date of Patent: Jul. 14, 2020

(54) PEER-TO-PEER GEOTARGETING CONTENT WITH AD-HOC MESH NETWORKS

(71) Applicant: RetailMeNot, Inc., Austin, TX (US)

(72) Inventors: Nicholas J. Shiffert, Austin, TX (US);
Shaun Dubuque, Austin, TX (US);
Alexander M. Cheng, Austin, TX (US); Jeffrey R. Rego, Austin, TX (US); J. Seth Randle, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 521 days.

(21) Appl. No.: 15/074,415

(22) Filed: Mar. 18, 2016

(65) Prior Publication Data
US 2016/0203522 A1    Jul. 14, 2016

Related U.S. Application Data

(63) Continuation-in-part of application No. 14/661,392, filed on Mar. 18, 2015, now Pat. No. 10,229,434.
(Continued)

(51) Int. Cl.
*G06Q 30/02* (2012.01)
*H04W 76/14* (2018.01)
*H04W 4/021* (2018.01)

(52) U.S. Cl.
CPC ..... *G06Q 30/0267* (2013.01); *G06Q 30/0261* (2013.01); *H04W 4/021* (2013.01); *H04W 76/14* (2018.02)

(58) Field of Classification Search
CPC ..... H04W 84/18; H04W 4/023; H04W 4/021; H04W 40/20; G06Q 30/0261;
(Continued)

(56) References Cited

U.S. PATENT DOCUMENTS

| 7,366,460 B2 * | 4/2008 | O'Farrell | G06Q 10/10 455/3.06 |
| 8,818,402 B1 | 8/2014 | Gauba et al. | |

(Continued)

FOREIGN PATENT DOCUMENTS

KR    1020120107045 A    9/2012

OTHER PUBLICATIONS

Shivkumar Lohar, SuperBeam Android App Transfer Files at High Speed, Jul. 1, 2014, StupidTechLife (Year: 2014).*
(Continued)

*Primary Examiner* — Naresh Vig
(74) *Attorney, Agent, or Firm* — Pillsbury Winthrop Shaw Pittman, LLP

(57) ABSTRACT

Provided is a process, including: obtaining, in memory of a first mobile computing device, a plurality of content items, at least some of the content items pertaining to respective different geographic areas; receiving, with the first mobile computing device, data indicating a user interaction with a given content item among the plurality of the content items; and in response to receiving the data indicative of the user interaction, transmitting a wireless signal from the first mobile computing device directly to a second mobile computing device that is different from the first mobile computing device, the wireless signal being indicative of the given content item and indicating that the given content item pertains to a given geographic area within range of the wireless signal transmission.

20 Claims, 13 Drawing Sheets

Related U.S. Application Data

(60) Provisional application No. 62/185,229, filed on Jun. 26, 2015, provisional application No. 62/135,914, filed on Mar. 20, 2015, provisional application No. 61/969,119, filed on Mar. 22, 2014, provisional application No. 62/103,652, filed on Apr. 15, 2015.

(58) Field of Classification Search
CPC ............... G06Q 30/0207; G06Q 30/02; G06Q 30/0241; G06Q 30/0205; G06Q 30/0214; G06Q 30/0251; G06F 17/30241; G06F 17/3087; G06F 17/30867; G06F 2221/2111
See application file for complete search history.

(56) References Cited

U.S. PATENT DOCUMENTS

| | | | |
|---|---|---|---|
| 8,949,889 B1* | 2/2015 | Erdmann | G06Q 30/00 725/22 |
| 9,204,251 B1* | 12/2015 | Mendelson | G08G 1/14 |
| 2007/0214040 A1 | 9/2007 | Patel et al. | |
| 2009/0319348 A1* | 12/2009 | Khosravy | G01C 21/20 705/14.1 |
| 2011/0093318 A1 | 4/2011 | Guday et al. | |
| 2012/0066495 A1 | 3/2012 | Hao et al. | |
| 2012/0323664 A1* | 12/2012 | Klems | G06Q 30/02 705/14.26 |
| 2012/0329555 A1* | 12/2012 | Jabara | G07F 17/3218 463/29 |
| 2013/0018714 A1* | 1/2013 | George | G06Q 30/0261 705/14.16 |
| 2013/0165208 A1* | 6/2013 | Nelson | G07F 17/3223 463/25 |
| 2014/0343991 A1* | 11/2014 | Hofstee | G06Q 30/0601 705/7.18 |

OTHER PUBLICATIONS

Alex Dobie, SuperBeam—Transfer Files Using Wifi Direct, NFC, or QR codes. Apr. 8, 2013, Mobil Nations (Year: 2013).*

Garyfalos et al., "Coupons: Wide scale information distribution for wireless ad hoc networks", 2004, IEEE Communications Society, Globecom 2004 (Year: 2004).*

International Search Report and Written Opinion for related PCT Application PCT/US2016/023158, dated Jul. 22, 2016, pp. 1 to 13.

* cited by examiner

PEER-TO-PEER GEOTARGETING CONTENT WITH AD-HOC MESH NETWORKS

CROSS-REFERENCE TO RELATED APPLICATIONS

This patent claims the benefit of U.S. Provisional Patent Application 62/185,229, titled "PEER-TO-PEER GEOTARGETING CONTENT WITH AD-HOC MESH NETWORKS," filed 26 Jun. 2015, and U.S. Provisional Patent Application 62/135,914, titled "Peer-to-Peer Sharing of Offers with Ad-hoc Mesh Networks," filed 20 Mar. 2015, and is a continuation-in-part of U.S. patent application Ser. No. 14/661,392, titled "CACHING GEOLOCATED OFFERS," filed 18 Mar. 2015, which claims the benefit of U.S. Provisional Patent Application 61/969,119, titled "MULTI-STAGE GEOLOCATED OFFERS," filed 22 Mar. 2014, and claims the benefit of U.S. Provisional Application 62/103,652, titled "Caching Geolocated Offers," filed 15 Jan. 2015. The entire content of each of these earlier-filed applications is hereby incorporated by reference for all purposes.

BACKGROUND

1. Field

The present invention relates generally to content distribution and, more specifically, to peer-to-peer geotargeting of content to users.

2. Description of the Related Art

Often users of mobile computing devices wish to consume content related to their current geolocation. For instance, users often prefer to view reviews of local businesses, advertisements, or offers relevant to the user's current geolocation. Frequently, such content is provided via wireless networks to users' mobile computing devices, such as cell phones. And such content is selected based on geolocations determined based on wireless signals, such as satellite navigation signals or cell phone tower signals, received by users' mobile computing devices. Thus, wireless signals received by mobile computing devices are used both to determine geolocation and receive content related to that geolocation.

Obtaining such content can be difficult when users are in areas with limited or no wireless access to the relevant wireless signals. For instance, the building structure of many big-box retailers or shopping malls can form a Faraday cage, in which such external signals are blocked or attenuated. This can impede content delivery, geolocation sensing, and in some cases, both.

In some cases, those delivering content based on geolocation have attempted to rely upon beacon transmitters within areas of limited or no wireless connectivity. Generally, the beacons transmit an identifier, the identifier is received by mobile devices in the area, and content is retrieved or selected based on a location associated with the identifier. In some cases, content may be targeted to a plurality of geolocations, such as a group of geolocations associated with entrances to a set of shopping malls. Such beacons, however, can be relatively expensive to install and maintain for large geographic areas, as the number of transmitters needed can be relatively large and batteries often need to be changed relatively frequently.

SUMMARY

The following is a non-exhaustive listing of some aspects of the present techniques. These and other aspects are described in the following disclosure.

Some aspects include a process, including: obtaining, in memory of a first mobile computing device, a plurality of content items, at least some of the content items pertaining to respective different geographic areas; receiving, with the first mobile computing device, data indicating a user interaction with a given content item among the plurality of the content items; and in response to receiving the data indicative of the user interaction, transmitting a wireless signal from the first mobile computing device directly to a second mobile computing device that is different from the first mobile computing device, the wireless signal being indicative of the given content item and indicating that the given content item pertains to a given geographic area within range of the wireless signal transmission and among the respective different geographic areas.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
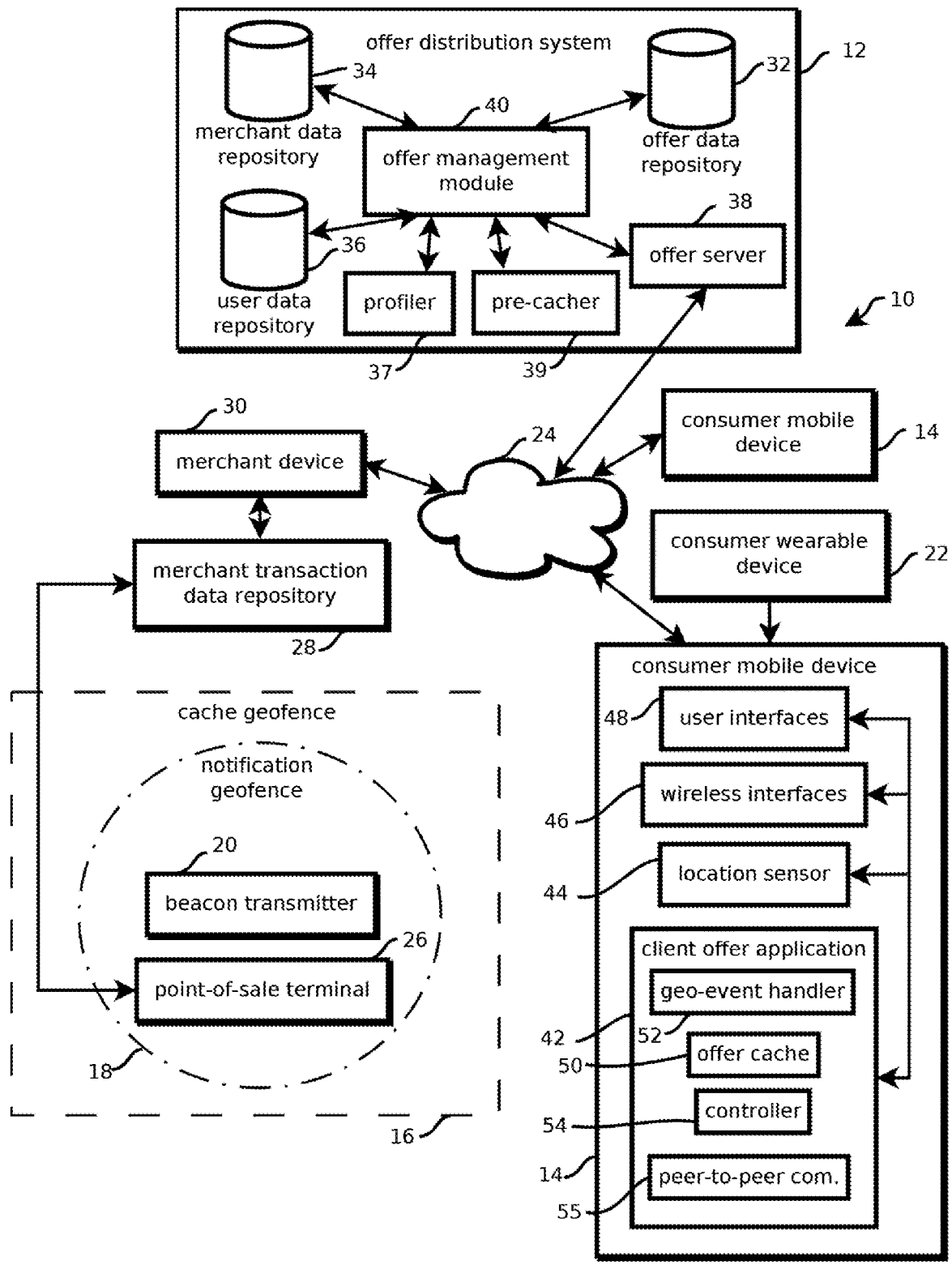
FIG. 1 shows an embodiment of an offer distribution system and consumer mobile devices configured to distribute, predictively cache, and geotarget geolocated offers in areas with limited wireless connectivity.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of peer-to-peer networking and content geotargeting. Indeed, the inventors wish to emphasize the difficulty of recognizing those problems that are nascent and will become much more apparent in the future should trends in industry continue as the inventors expect, particularly those problems that are cross-disciplinary and span the fields of peer-to-peer networking and content geotargeting. Further, because multiple problems are addressed, it should be understood that some embodiments are problem-specific, and not all embodiments address every problem with traditional systems described herein or provide every benefit described herein. That said, improvements that solve various permutations of these problems are described below.

The present techniques apply to a variety of different types of content. For instance, local microblogs may be provided, reviews of nearby businesses may be provided, local search results may be provided, or offers redeemable at local merchants may be provided. The techniques are best illustrated with content that varies in relevance to users based on the user's location. Accordingly, examples are described with reference to offers created and provided according to geolocation, but the techniques are not limited to offers, nor are the claims directed to the creation, formation, or provision of offers unless offers are explicitly recited (which is not to suggest that claim scope may not encompass such subject matter, merely that it is not the subset matter to which the claims are directed).

By way of example, these techniques are described with reference to offers conveyed by offer distribution systems. Offer distribution systems are used by merchants (e.g. retailers, service providers, and the like) to convey offers (e.g. coupons, rewards, or sales) to consumers over networks, like the Internet. In some cases, offers may be redeemable in-store, for example, by a consumer printing the offer at home and presenting the printout to a store clerk or by the consumer presenting the offer with a mobile device, like a cell phone, to the merchant. In some cases, offers may be redeemable online, for example, on a merchant's website by a consumer entering an offer-specific code at checkout. Generally, one or more entities operating an offer distribution system obtain data describing the offers from merchants, and the offer distribution system is used to distribute the offers to (in some cases, select) consumers and help consumers find relevant offers. In many cases, merchants compensate entities operating offer distribution systems for such services, for example, based on offer impressions or redemptions by consumers. In one type of offer distribution system, an affiliate network distributes offers to publishers, and the publishers then distribute offers to consumers. In this type of system, the affiliate network typically tracks redemptions of the offers, such that the publishers can be compensated by merchants. In another type of offer distribution system, a single entity obtains the offers from a merchant and distributes those offers to consumers, e.g., using websites or native mobile applications provided by that entity to consumers to access the offer distribution system.

FIG. 1 is a block diagram showing an example of a distributed computing environment 10 having components that mitigate various problems with traditional offer distribution systems. For example, some embodiments mitigate problems that arise in the context of geo-targeted offer distribution due to poor wireless connectivity. For instance, when a user, such as a consumer, is within a merchant's brick-and-mortar store, and at a geolocation at which a particular offer is relevant, many systems fail to alert that user to the offer (e.g., either automatically based on location, or in response to user searches for local offers) because diminished or absent wireless connectivity prevents delivery of the offer from a remote server. Often store walls or shelves contain relatively large amounts of conductive material, forming, in effect, a Faraday cage, in which it is difficult for a user's hand-held wireless device to exchange signals with an external cellular tower (or other wireless access point, e.g., in-store WiFi™) to convey data to an offer-related mobile client application (e.g., a native application executing on the user's wireless device, or an web page rendered in a browser executing on the wireless device). Poor wireless connectivity can also be a problem in outdoor areas, e.g., for offers targeted to rural areas, or offers targeted to events in which high-density, large crowds overwhelm local cell tower capacity, such as during a sporting event or concert.

In many cases, due to poor connectivity, users are not alerted to relevant offers, stores fail to capture marginal revenue that such offers would have driven, and publishers of offers fail to receive compensation for driving desired user behavior. These and other problems are expected to be mitigated by some of the following embodiments. It should be understood, however, that various independently inventive concepts are disclosed and not all embodiments necessarily address all described problems. Various engineering and cost tradeoffs may favor use of only a subset of the described techniques in certain scenarios.

This problem with connectivity may be mitigated with some of the techniques described below. Some embodiments of the computing environment 10 1) automatically detect offer-related areas (e.g., stores, malls, and their surrounding area) in which wireless connectivity is unreliable or absent based on periodic (e.g., nightly, or weekly) analysis of logged user interactions with an offers application in those areas indicating failed attempts by the application to retrieve offers; 2) later, in response to identifying such an area, and in response to detecting that a user is approaching such an area (e.g., within a threshold distance of), cache offers related to those areas before users enter the areas with cache memory (e.g., in persistent or dynamic memory, such as memory in a hard drive, a solid state drive, flash memory, dynamic random access memory, or the like, storing cached values in program state, a file, a database, or the like) of an offers application executing as a background process on users' mobile devices; 3) later present the cached offers (e.g., a location-relevant subset of the cached offers) from the cache memory to the user while the user is in the area (e.g., a portion of the area in which the offer is particularly relevant, e.g., as indicated by a beacon signal emitted in the relevant area), without that presented offer being retrieved at the time of presentation from a remote server via a wireless (e.g., cellular, or local area wireless network) connection. Not all embodiments, however, necessarily perform all of these steps, e.g., profiling may be offloaded to a third party, which is not to imply that any other feature may not be omitted.

These and other problems with traditional offer distribution systems are mitigated by aspects of embodiments described below. But it should be appreciated that some embodiments address only a subset of these problems or other problems apparent to those of skill in the art upon reading the present disclosure. Indeed, as explained in the concluding paragraphs of this specification, the present disclosure includes a number of independently useful inventions that are described in a single document because those inventions are also useful together. Accordingly, any description of a problem or a benefit associated with the present techniques should not be read as defining "the invention" of the present application, as the present application relates to several inventions, some of which are defined in the originally filed claims, and others that may be addressed in later claim amendments or continuation applications.

In some embodiments, the computing environment 10 includes an offer distribution system 12 and mobile computing devices, such as consumer mobile devices 14 (e.g., cell phones, hand-held tablet computers, wearable computing devices, and the like having portable power supplies, like batteries) configured to alert users to an offer in response to the users being geographically proximate a merchant's physical location, like a relevant subset of a merchant's physical location (e.g., a store entrance, department, aisle, or subset thereof to which an offer relates). Proximity may depend upon the use case. In some embodiments, offers may be determined to be relevant to the user's current location in response to the user being within 50 meters of a store entrance, within 10 meters of a store department or aisle, or within around one meter of a particular product display, for example. In many cases, the area of relevance is substantially or entirely within a store or larger structure (like a mall) that impairs wireless connectivity.

In some applications, the user may be notified of an offer upon that consumer's mobile device 14 detecting that the user is within a first geographic location (e.g., a notification geographic location). A notification geographic location (e.g., an area or point) may be characterized by some designation of a geographic location to which an application on a consumer's mobile device is responsive, like a geofence 16 defined by a polygon having vertices expressed as longitude and latitude coordinate pairs or a center point and radius; a store in which the user has checked-in; or in a broadcast area in which a store, department, or aisle identifier is embedded in some radiated signal like in-store lighting (for instance, using visual light communication drivers from eldoLED B.V. of the Netherlands connected to in-store light-emitting diodes in light fixtures), a WiFi™ service set identifier (SSID), or in-store audio; an aisle or department in which a Low-Energy Bluetooth beacon is received; or position where a location identifier is scannable by the consumer's mobile device, such as in viewable range of a QR code, or within range of a near-field communication tag. In some cases, the geographic location is defined by a wireless beacon 20 (such as a Low Energy Bluetooth™ beacon defined by a version of the Bluetooth standard including or post dating the Bluetooth Core Specification Version 4.0). The geographic location may be sized such that users in the geographic location are within the store of a merchant issuing the offer, are near the store of a merchant issuing the offer (for instance, within a short walk, like 50 or 100 meters for the notification geographic location), or are in a particular department of a merchants store, depending on the marketing objectives of the merchant. In some cases, notification geographic locations may be signaled with the peer-to-peer geotargeting techniques described below with reference to FIGS. 8-12.

In some embodiments, the computing environment 10 includes the offer distribution system 12, consumer mobile devices 14, a consumer wearable device 22, the Internet 24, a point-of-sale terminal 26, a merchant transaction data repository 28, and a merchant computing device 30. The offer distribution system 12, in some embodiments, may manage (e.g., store, distribute, and track) offers created by a merchant, e.g., with merchant device 30. These components are described in greater detail below after a brief overview of a use case.

In some applications, the offers may be distributed to consumer mobile devices in response to those consumer mobile devices determining that the respective devices are within the geographic location 16 or the surrounding area. In some cases, the offers may be redeemed based on the consumer mobile devices 14 determining that the respective devices are within the other geographic location 18, which may be specified in the offer as the place where the offer is redeemed. The consumer mobile devices 14 may report travel to location 18 to the offer distribution system 12 for centralized tracking. In some cases, users enticed to visit a store at location 18 may purchase goods or services with the point-of-sale terminal 26, and the entity operating the offer distribution system 12 may be compensated based on records of those purchases stored in the merchant transaction data repository 28. The various components of the computing environment 10 may be geographically distributed and may communicate with one another remotely via the Internet 24 and various other networks, such as cellular networks, wireless area networks, local area networks, and the like.

In some embodiments, the offer distribution system 12 includes an offer data repository 32, a merchant data repository 34, user data repository 36, a wireless-connectivity profiler 37, an offer server 38, a pre-cacher module 39, and an offer management module 40. The offer data repository 32 may store offer records describing offers, the merchant data repository 34 may store merchant records describing merchants, the user data repository 36 may store user profiles, the offer server may send data about offers over the Internet 24 and receive data about offers, and the offer management module 40 may coordinate the operation of these other components to provide the functionality described herein. The profiler 37 may perform a process described below with reference to FIG. 5 to identify geographic areas in which offers are to be cached due to poor wireless connectivity. The pre-cacher 39 may participate in the processes described below with reference to FIGS. 6 and 7 to cache locally-relevant offers on mobile devices entering areas designated by the profiler 37.

In some cases, the offer distribution system 12 manages offers for hundreds of merchants issuing tens of thousands or hundreds of thousands of offers to relatively large geographic areas, such as the United States or a substantial portion of the world, and those offers are distributed to millions, tens of millions or hundreds of millions of consumer mobile devices. Accordingly, some embodiments of the offer distribution system 12 may include computing components that are replicated and use load-balancing servers to reduce latency and operate at such scales. It is expected that users generally desire to interact with offers selected from a relatively large pool of offers to see offers that are relatively likely to be relevant to those users, and merchants generally desire to distribute their offers to a relatively large number of users. At the same time, it is expected that such users are often relatively sensitive to latency when interacting with such offers, e.g., changes on the order of 300 milliseconds are expected to materially affect usage statistics. Accordingly, to facilitate both scale and speed, some embodiments may be constructed in a data center, and content may be hosted by content delivery networks to expedite delivery of bandwidth intensive content, such as images or video. Further, records in the various data repositories may be replicated in various indexed data structures, such as hash tables, sorted list, prefix trees, and the like that are pre-processed to facilitate relatively fast retrieval of records based on multiple, frequently-used query values.

In some embodiments, the offer-data repository 32 includes a plurality of offer records, each offer record describing an offer, such as a coupon, sale, conditions for entry to a game of chance, conditions to receive some other benefit, or the like. Each offer record may include a unique offer identifier, a summary of the offer, a more detailed description of the terms of the offer, a identifier of a merchant issuing the offer, an expiration time for the offer, content for presenting the offer (e.g., images, like video, illustrating the good or service subject to the offer), and a category or subcategories of the offer (e.g. restaurants, sporting goods, retail clothing, and various other hierarchical categories in an offer ontology).

Some of the offer records may describe geolocated offers, which specify one or more geographic locations (e.g., areas or points) in which a consumer mobile device travels in order for a respective consumer to be presented with (or otherwise alerted to) the offer or (i.e., and/or) to redeem the offer.

Offer records for multi-stage geolocated offers may include a notification geographic location defining a geographic location where a consumer is to be alerted to the offer. Geographic locations may be described with a value indicating the type of geographic location description. An example description is a geofence, with which the geographic location is described with reference to an absolute geographic reference, like geographic coordinates, for instance, latitude and longitude coordinates defining vertices of a polygon specifying the geographic location, or latitude and longitude coordinates for a vector graphics representation of the geographic location (e.g., a center point coordinate and a radius). Another example description is a wireless transmission range in which the geographic area is defined by the range over which a wireless signal is discernible (or is received with greater than a threshold signal strength or less than a threshold amount of attenuation as indicated by calculating difference between a signal strength with which the signal is received and a broadcast signal strength value encoded in the signal), such as the range over which a consumer mobile device can discern an identifier encoded in a Low Energy Bluetooth Beacon, a Bluetooth Beacon, a Wi-Fi Beacon, or the like. In some cases, the signal is deemed discernible if a value encoded in the wireless signal is received by a consumer mobile device, such as a value uniquely identifying the transmitter (or the merchant, or the merchant's site) that corresponds to the geographic location, like a beacon identifier or an SSID value selected with reference to a namespace that distinguishes other transmitters and other locations. Another example of wireless transmission includes such values being encoded in audio signals in a merchant's on-site music (which may be detected by a consumer mobile device's microphone) or such values being encoded in a merchant's overhead lighting (which may be detected by a light sensor on a consumer mobile device). Other examples include scannable signals, for instance an identifier received upon the user placing their mobile device near a near-field communication tag, or directing a camera of the mobile device toward a QR code or bar code. These wirelessly encoded identifiers may be stored in the offer record in association with the geographic location, such that consumer mobile devices may be sent the identifier and detect transmission of the identifier to determine that the consumer mobile device is at a geographic location.

Geolocation may be determined based on one or more wireless signals, e.g., receipt of an identifier in, or signal strength of, a beacon from a Low Energy Bluetooth transmitter, an identifier of one or more cellular base stations in range, a SSID in a WiFi beacon, a value encoded in overhead lighting, a value encoded in ambient audio, satellite navigation signals (e.g., Global Positioning system, Glonass, or Galileo signals), or the magnetic landscape produced by interaction between a building and the Earth's magnetic field (e.g., according to geolocation services from IndoorAtlas of Mountain View Calif.). In some cases determining a geolocation can include determining a geolocation entirely on the client device or in cooperation with a remote system that identifies the geolocation based on signature of the wireless environment sent by the client device (e.g., based on cooperation with the geolocation service of SkyHook of Boston Mass.). In some cases, geolocation may be determined with a variety of different techniques with tradeoffs between speed, accuracy, and power consumption, e.g., based on a cellular tower identifier for relatively low power consumption, high speed, and low accuracy (like on the order of one kilometer), or based on GPS signals for relatively high power consumption, low speed, and high accuracy (like on the order of 10 meters). In some cases, a geolocation may be determined with a relatively fast technique and then later updated based on slower, more accurate techniques. In some cases, a last-known good location (e.g., from a parking lot of a store) may be used as a base location, and subsequent inertial measurements may be integrated to calculate an offset location from the base location, which may be added to the base location to infer a current location, e.g., with simultaneous location and mapping (SLAM) approaches.

In some cases, the description, type, and size of geographic locations are selected based on the desired type of user interaction. In some embodiments, geofences are used for outdoor or geographic areas larger than approximately 10,000 $m^2$ due to the relatively low resolution and reliability of signals by which geographic coordinates of a mobile devices current geographic location are determined by mobile devices. In some cases, wireless transmission ranges are used for an indoor or geographic areas smaller than approximately 10,000 $m^2$ due to their higher reliability offsetting the higher cost of providing such signals in these cases. In some examples, a wireless transmission range may be configured such that the corresponding geographic location is larger than approximately 100 m² to make it relatively easy for users to find the respective geographic location, for instance, by walking into the interior of an identified store or passing through a door of an identified store. In another example, the wireless transmission range may be on the order of approximately 1 meter or less, for example, based on near field communication (NFC) transmissions, and users may be targeted in a relatively specific location, for instance, when standing in front of a particular shelf in a store. Because of the distinct use cases, some embodiments may use a different description type for NFC and similar transmission ranges, referring to these geolocation descriptions as point geolocations. In some cases, point geographic locations are distinct from the point-of-sale terminal 26, such that the user is targeted near merchandise or services that the merchant wishes to sell, rather than to a checkout counter where the user would not necessarily be exposed to such merchandise or services.

In some cases, some or all of the offers (including multi-stage geolocated offers) are single-use offers for which each instance of the offer is separately tracked by the offer distribution system 12 and is redeemable a limited number of times (e.g., once), in contrast with multi-use offers in which the same information (e.g., an offer code) may be used by a relatively large number of users, and the number of users in possession of the offer is not necessarily known (e.g., due to email sharing, photocopying, and the like). For single-use offers, each offer record may include an amount (e.g., a number) of instances of the offer to be redeemed, to be reserved (as some merchants wish to avoid disappointing users who believe they have a valid offer only to arrive at a store and find that all permitted redemptions have occurred), or both. Further, for single-use offers, each offer record may include a plurality of offer instance records, each instance record including an offer instance identifier, a value indicating whether the offer instance has been reserved, a value indicating whether the offer instance has been redeemed, an identifier of a user who has redeemed the offer instance if available, and an identifier of a user who has reserved the offer instance if available. For some multi-stage single-use geolocated offers, offer instances may be reserved by simply being in the notification geographic area. In other cases, the user may be asked to take further affirmative steps, such as interacting with an interface on the consumer mobile device 14 to cause the mobile device to indicate to the offer distribution system 12 that the user wishes to reserve an offer instance. Thus, the value indicating whether the offer instance has been reserved may be used to determine whether a user who later enters the reward geographic area qualifies for the reward, or some embodiments may perform this determination based on client-side offer state data stored in consumer mobile devices, such as a value indicating that the consumer mobile device was previously in the notification geographic location. In some cases, digital offer instances may be maintained as a rivalrous good without a centralized arbiter of the offer instances, for instance with a blockchain public database, or distributed public ledger, in which transactions of offers (like allocation to users or publishers by merchants, transfers between or to users, and redemption of coupons or other offers) are validated by broadcasting the transactions to computing nodes that perform proof of work algorithm (or demonstrate proof of storage of some value), like processing a cryptographic hash function, such as SHA-256, and indicate a consensus as to whether the transaction is valid (e.g., to prevent double redemption of offer instances).

The merchant data repository, in some embodiments, may include a plurality of merchant records, each merchant record describing an individual merchant. Each merchant record may include a name of the merchant, a unique identifier of the merchant, content used to present offers from the merchant (e.g., images, like the merchant's logo), roles and permissions defining (a term which is used here interchangeably with the term "specifying") which merchant employees are permitted to control (e.g., create, change, and track) offers, templates for creating offers (e.g., preconfigured geographic locations from which the offer creator might select), and a plurality of store records, each store record describing a geographic location one of the merchant's stores, such that offers may be selected for presentation to users based on a user's proximity to a store by the offer distribution system 12.

The user data repository 36, in some embodiments, may include a plurality of user profiles. Each user profile may include a username, a password, a unique user identifier, demographic information about the user (e.g., a residential address, an occupation type, interests, and the like), and interaction records describing previous interactions by the user with the offer distribution system 12. In some cases, the geolocated offers may be selected for presentation to (or caching for contingent presentation) a user by the offer distribution system 12 based both on the user's location and the user's user profile satisfying criteria relating to the demographic information or a pattern in the interaction records. For example, a merchant may specify, when defining an offer, that users scoring above a threshold on a metric indicative of affinity for sports may be alerted to a multi-stage geolocated offer in response to those users entering a geofence. Or two geofenced offers may be ranked by the offer distribution system 12 based on similarities between those offers and previous offers the user has redeemed, and the offer more similar to previously redeemed offers may be sent to the user based on the ranking.

The offer server 38 may interface between the offer management module 40 and the Internet 24. For example, the offer server 38 may listen to a port through which information is exchanged with the other components of the computing environment 10 and translate signals (e.g., data, like commands or content) into a format to which the offer management module 40 is responsive or from a format in which such signals are supplied by the offer management module 40. In some cases, the offer server 38 may parse received hypertext transport protocol (HTTP) requests (or other application layer protocol exchanges, like SPDY) to identifying corresponding functions of the offer management module 40 and call the corresponding functions of the offer management module 40 with data encoded in the HTTP requests as function parameters. In some cases, the offer server 38 includes a web server, an application program interface server, or both.

Figure 2:
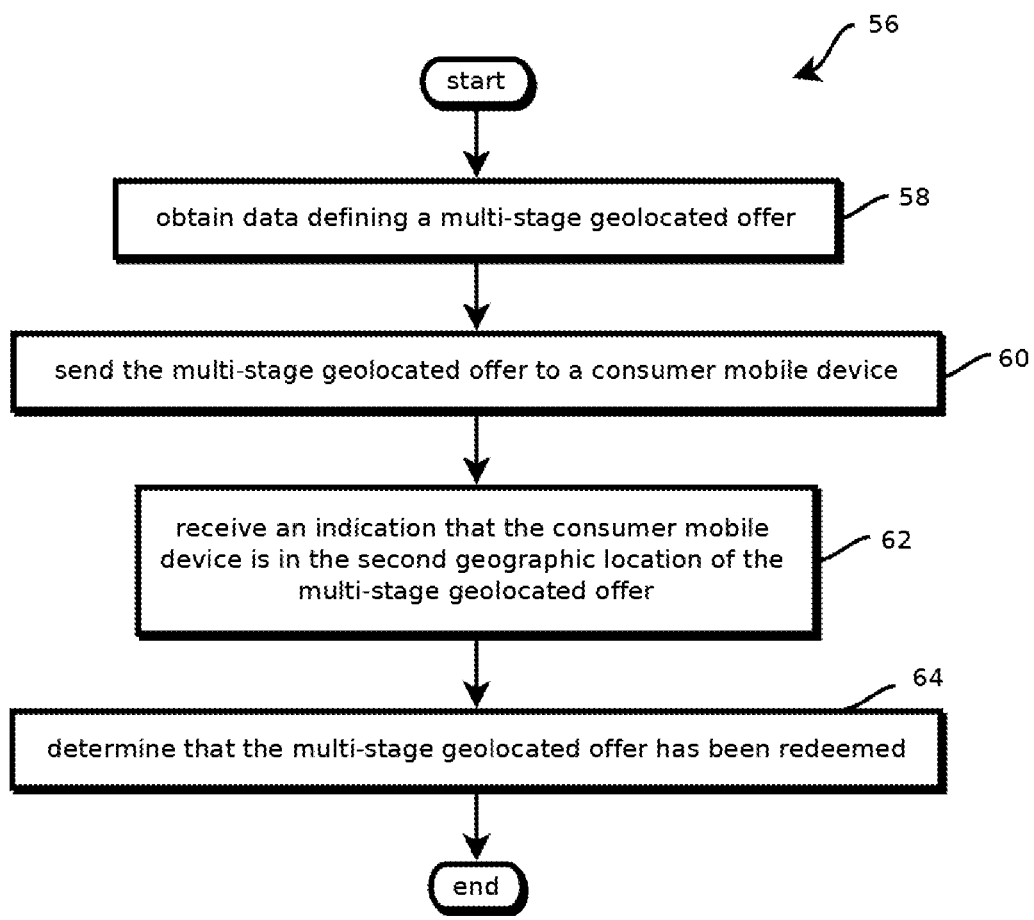
FIG. 2 shows an embodiment of a process for distributing and tracking multi-stage geolocated offers that may be performed by some embodiments of the offer distribution system of FIG. 1.

The offer management module 40 may perform a process described below with reference to FIG. 2 and interact with the other components of the offer distribution system 12 to provide the functionality described herein. For instance, the offer management module 40 may receive requests for offers from the consumer mobile devices 14 (including requests for offers to cache), query the offer data repository, and return responsive offers via the offer server 38. In some cases, such requests indicate a current geographic location of the respective requesting consumer mobile device 14 as sensed based on the current wireless environment of the consumer mobile device 14, for instance, including an identifier conveyed with a wireless beacon or a geolocation sensed based on satellite navigation signals received by the consumer mobile device 14. In some cases, the offer management module 40 may retrieve geolocated offers (e.g., offers associated with a geographic location in which users are to be alerted to the offer based on location sensed with a cell phone) based on the location in such a query. As noted above, offers may be ranked for presentation in response to such a query based on previous user actions stored in the user data repository 36 as well as geographic proximity. Further, some embodiments may score offers based on an expected return to the entity operating the offer distribution system calculated according to the user profile, a merchant profile, and attributes of the offers, like an amount of a discount, redemption rates for the offer, or a category of the offer.

Some embodiments of the offer management module 40 may send offers corresponding to both the current geographic location of the consumer mobile device and the surrounding area, such that nearby geolocated offers (e.g., offers not presently relevant, but potentially relevant should the user move) may be stored in cache memory of the consumer mobile device 14. Cached offers may be recalled from memory by the consumer mobile device 14, for instance, in the event that the consumer mobile device 14 moves into a relevant geographic area and lacks adequate signal strength to communicate with the offer distribution system 12. Caching both currently relevant and potentially relevant geolocated offers is expected to further offer benefits relating to battery consumption of the consumer mobile devices 14, as fewer interactions with the offer distribution system may be used to convey information. That said, not all embodiments use this caching technique, as other aspects are independently useful, which is not to suggest that any other feature is not also optional in some embodiments.

In some cases, the offer management module 40 may update records in the offer data repository 32 and interaction records in the user data repository 36 to reflect interactions with offers. For example, upon a user being sent an offer, both records may be updated, and upon a user redeeming the offer or taking affirmative steps to reserve the offer, both records may be updated by the offer management module 40 based on corresponding signals indicative of such interactions sent by the consumer mobile device 14, merchant device 30, or POS terminal 26, depending on the activity and configuration.

In some cases, before sending instructions to present a notification, embodiments of the offer management module 40 may compare a threshold amount of instances of an offer to be reserved or redeemed (e.g., as specified by a merchant) to a current amount of instances of an offer that have been reserved or redeemed. In response to determining that the amount exceeds the threshold, embodiments may determine that the offer is not to be sent. And in response to determining that the amount does not exceed the threshold, embodiments may determine that the offer may be sent and adjust the current amount (e.g., increment or decrement a count). In some use cases, offers are not rivalrous, and offers may be distributed without regard to how many were previously distributed or redeemed. Some embodiments may distribute offers in a non-rivalrous fashion but cap redemptions to a certain number, e.g., the first 100 redemptions when 200 offers were distributed.

The data indicating that the consumer mobile device 14 has moved into a geographic location (e.g., a notification geographic location) may come from the consumer mobile device itself (as described below) or from another device, such as a beacon sensor at a merchant store sensing the consumer mobile device is transmitting such an indication to the offer distribution system 12, depending on the embodiment. In some cases, a client offer application described below causes the consumer mobile device to transmit a beacon (such as a Low Energy Bluetooth beacon, or other wireless signal, like a signal in a near field communication transmission), and a computing device operated by the merchant detects the wireless signal and sends an indication to the offer distribution system 12. In some cases, the wireless signal includes an identifier of the consumer mobile device or an identifier of the user corresponding to a user profile, and this identifier is sent by the merchant computing device to the offer distribution system 12 indicating that the user is at the specified geographic location.

Data indicating a user is entitled to redeem an offer may be conveyed by the offer management module 40 with a variety of techniques. For example, the respective consumer mobile device 14 may be texted, emailed, or otherwise sent instructions (e.g., commands or other data that when processed causes a corresponding activity to occur) to display a notification indicating a uniform resource identifier (URI) from which the user may retrieve proof that the user is in possession of the offer. For example, the user may be sent a URI with which the user may retrieve a code that when presented to a merchant validates that the user is entitled to the reward. In one example, the offer management module 40 may send the respective consumer mobile device 14 an image of a validation code in a one-dimensional visual code (e.g., a bar code or a flashing screen) or a two-dimensional visual bar code (e.g., a QR code) format, and an optical scanner or mobile device operated by a merchant employee may scan the code from a display screen of the consumer mobile device with an image sensor, like a camera. In some cases, the point-of-sale terminal 26 or a merchant employee mobile device may send an indication that the validation code has been scanned or otherwise entered or presented to the offer distribution system 12, and the offer distribution system 12 may determine whether the validation code is valid (e.g., corresponds to a validation code in memory previously sent to a qualified user and has not been previously validated) and respond with a signal indicating whether the validation code is valid. Further, the offer management module 40 may update a record of an offer instance in which such a code is stored to indicate that the reward has been claimed, so that the offer management module 40 may determine that subsequent request to validate the same validation code are to be rejected. In another example, offers may be conveyed to an electronic wallet account associated with a user profile of the user or a card-linked offer account associated with a profile of the user, and the user may redeem the offer by accessing their electronic wallet account with their mobile device or presenting the appropriate card to a merchant. In some cases, e.g., for particularly valuable single-use offers, a user mobile device (or corresponding merchant-provided device, such as the point-of-sale terminal) may sense biometric data of the user and validate that the user is present as a condition of validating the offer. For instance, some embodiments may authenticate the user's presence with a finger print sensor of the mobile device, some embodiments may capture an image of the user's face with a camera of the mobile device, or some embodiments may instruct the user to speak a phrase and capture an audio sample of the user's voice. The captured biometric data may be compared to a record in memory (e.g., in memory of the user device, of a manufacture of the user device, or in the user profile of the offer discover system) of the user's biometric attributes to determine whether the user is present based on whether the acquired biometric data sufficiently matches that stored in memory.

In some cases, the entity operating the offer distribution system 12 may be compensated by a merchant for various activities that may be tracked in the computing environment 10. For instance, the entity may be compensated for users being presented with notifications, users reserving offers, users traveling to the reward geographic location, users claiming their reward, or user purchases after one or more of these events (e.g., within some threshold duration of time corresponding to a typical single visit to a merchant's physical site, such as within the next six hours following one of these events). Accordingly, the consumer mobile device 14 and the merchant device 30 may send signals to the offer distribution system 12 indicating when such events occur and providing data by which compensation may be determined, such as transaction data indicating what a consumer purchased and a validation code presented by the user to claim the reward. Traditional offer distribution systems often suffer from what is referred to as "breakage" when sales clerks fail to credit the entity operating the offer distribution system 12 for sales driven by that entity. Tying transaction records to a value presented when claiming a reward and associated with a user profile is expected to reduce breakage. That said, not all embodiments necessarily provide this benefit, as the other aspects described herein are independently useful, which is not to suggest that any other feature described herein may not be omitted in some embodiments.

The consumer mobile devices 14 may be cell phones, tablet computers, or other computing devices having a portable source of power and that are typically with a user when away from their home and work. Two consumer mobile devices 14 are illustrated by way of example, but as noted above, embodiments are consistent with substantially more, for example, more than ten-million consumer mobile devices distributed over a relatively large geographic area, such as North America and Europe. In some embodiments, consumer mobile devices 14 may each execute a client offer application 42 configured to cooperate with the offer distribution system 12 to manage multi-stage geolocated offers. Various resources of the consumer mobile device 14, including a location sensor 44, wireless interfaces 46, and user interfaces 48 may be accessed by the client offer application 42 via the operating system of consumer mobile devices 14 to effectuate operations described herein. The location sensor 44 may include a global positioning system (or other satellite navigation system, like GLONASS) sensor operative to determine a current latitude and longitude of the consumer mobile device 14 based on satellite navigation system signals. In some cases, the location sensor 44 also or alternatively uses identifiers of cell towers in range or other wirelessly transmitted identifiers, such as SSID identifiers of wireless area networks. In some cases, the consumer mobile device 14 may determine location by sensing such wireless signals analyzing those signals with the techniques described above. The wireless interfaces 46 may include Bluetooth, NFC, cellular, and Wi-Fi wireless interfaces among others, through which the various signals noted herein may be exchanged. In some cases, the mobile device further includes a magnetometer by which the wireless landscape of space may be sensed, e.g., by fusing data from the magnetometer with accelerometer data and wireless signals sensed by the mobile device to profile changes in magnetic fields over space (like an in-door space where other techniques may be less accurate in some cases) and match those profiles with known profiles indicative of geolocation. Some embodiments may combine the above-described SLAM-inferred locations with those obtained with magnetometer readings (e.g., in a weighted sum of latitude and longitude values respectively, or with other types of sensor fusion techniques) to locate users. The user interfaces 48 may include a display screen of the consumer mobile device 14 upon which notifications are displayed and various interfaces for reserving offers and claiming rewards are displayed. User interfaces 48 may further include a haptic interface by which, for example, the consumer mobile device 14 may be caused to vibrate when a notification is received, and a speaker that may be caused to emit sound when a notification is received.

In some embodiments, the client offer application includes an offer cache 50, a geo-event handler 52, a controller 54, and a peer-to-peer communication module 55. These components may communicate with one another and the various resources 44, 46, and 48 to manage geolocated offers.

In some cases, controller 54 may instruct the location sensor 44 to generate a geolocation event when (e.g., in response to the following) the consumer mobile device 14 moves more than a threshold amount, for example, more than a threshold distance, or from one area to another, such as from one cell tower to another. Using coarser-grained locations (e.g., by setting a desired accuracy attribute of a geolocation framework or library of a mobile device operating system to approximately 1 kilometer or larger) to generate such events is expected to reduce battery consumption relative to systems that continually monitor fine-grained location readings, though embodiments are consistent with monitoring of fine-grained location data.

In response to such an event, the geo-event handler 52 may signal the controller 54 to execute a routine by which geolocated offers are requested from the offer distribution system 12. The request may include an identifier of the current geographic location (e.g., a latitude and longitude, or an identifier of a geofence or beacon), and the offer distribution system 12 may respond with a plurality of geolocated offers. In some cases, responsive offers may include offers in a surrounding geographic area, some of which specify geographic locations in which the consumer mobile device 14 is not presently residing.

The surrounding offers may be stored in the offer cache 50 for reference in the event that the consumer mobile device 14 moves into areas in which these surrounding multi-staged geolocated offers are relevant, or in the case of an area designated for caching of offers, the offers may relate to locations in the cache geographic area. Caching a group of offers corresponding to such an area (which may be a cache geofence) with a single request is expected to reduce battery consumption of the consumer mobile device 14 and render the client offer application 42 more resilient to interruptions in communication with the offer distribution system 12 (though other embodiments may use multiple requests to, e.g., favor fresher data over battery life). For example, some embodiments of the client offer application 42 may determine whether the consumer mobile device location sensor 44 indicates the consumer mobile device is in a cached notification geolocation, and in response, present the appropriate notification that the corresponding offer is available, in some cases, even in the absence of contemporaneous communication with the offer distribution system 12. Later, upon communication being reestablished, a buffer storing corresponding updates for the offer distribution system 12 may be accessed, and the stored data may be transmitted to the offer distribution system 12 to synchronize the state of the geolocated offers between the offer distribution system 12 and the client consumer mobile device 14.

The controller 54 may periodically (or intermittently in response to some external stimulus, like a change in the current wireless environment) determine whether the current geographic location sensed by the location sensor 44 or wireless signals received by the wireless interfaces 46 corresponds to any geolocated offers. For instance, upon determining that the current latitude and longitude of the consumer mobile device 14 is within a notification geofence to which a cached offer is responsive, or a wireless identifier received by the wireless interfaces 46 corresponds to a wireless range geolocation, the controller 54 may cause the offer to be presented and update the record of the corresponding geolocated offer in the offer cache 50 and send instructions to the offer distribution system 12 to do the same (or add such an instruction to a buffer of data to be sent when a data connection is restored). For example, the controller 54 may periodically poll a Bluetooth™ interface for identifiers of Bluetooth beacons within range and query multi-stage geolocated offers in the offer cache 50 for geographic locations corresponding to the identifiers. And the controller 54 may periodically poll the location sensor 44 for a current latitude and longitude and determine whether the current latitude and longitude is within any geofences identified in the offer cache 50.

In some cases, embodiments may execute (e.g., on the client or server) a ray-casting algorithm or a winding number algorithm to determine whether a current location is within a geofence. For instance, some embodiments may determine whether a current location is within a polygon corresponding to a geofence by counting a number of times a ray originating at the current location intersects a side of a polygon defining a geofence and, then, determining whether the current location is within the geofence based on whether the count is odd (corresponding to being inside) or even (corresponding to being outside). In some such implementations, every edge of the polygon may be tested for intersection with the ray, and vertices may be tested for intersection with the ray and tracked in memory as already having been deemed intersected to avoid double counting of vertices for adjacent sides. Alternatively, or additionally, the current location may be compared to a geofence by summing angles between rays extending from the current location and vertices defining each sequential side of the polygon. Some embodiments may deem the current location to be inside the geofence in response to determining that the sum is non-zero. Some embodiments may calculate such angles according to an inverse trigonometric function, or to expedite processing and avoid computationally expensive calculations, some embodiments may leverage the closed shape of the polygon and simply account for which quadrant each additional edge places each sum. Some embodiments may determine whether a point is inside a polygon by comparing a geohash (or geohashes) of the polygon (e.g., a collection of square, geohashed areas that approximate or match the polygon area) to a prefix of a geohash of the current location, with a prefix matching the polygon geohash (or one of its geohashes) indicating that the location is inside the polygon. For instance, a geohash of a polygon may have 8 significant digits, and a geohash of a current location may have 12 significant digits, in which case the 8 most significant digits of the current location may serve as the prefix to match to the geohash of the polygon. In some cases, geohashes may be calculated by mapping geographic areas to space filling curves, such as Hilbert curves or Z-curves, with finer features of the curved encoded as less significant digits of a serialized encoding of location.

In some cases, notifications may be presented by the controller 54 requesting the operating system to present a notification using an application program interface of the operating system, such that notifications are presented on a lock screen of the consumer mobile device 14 or on a header area of the home screen of the consumer mobile device where users typically expect to view such notifications. Notifications may be presented by a background process, or notifications may be displayed in the context of a mobile client application having the focus of the user interface.

The module 55, in some embodiments, may execute on the consumer mobile device 14 and effectuate sharing of offers with nearby mobile computing devices through direct wireless transmissions to those nearby (e.g., within less than 100 meters) computing devices, for example, via ad hoc mesh networks formed by collections of consumer mobile devices 14. In some cases, the communication module 55 may perform the operations of processes described below with reference to FIGS. 9 and 10.

Some embodiments provide the user a multi-screen experience in which the state of geolocated offers is consistent across multiple devices and multiple consumer devices perform different portions of the client-side functionality described herein. For example, an in-dash automotive computer may correspond to one of the consumer mobile devices 14, and a cell phone may correspond to another one of the mobile devices 14. In this use case, the in-dash computer may determine that the user is in a cache geographic location and instruct a cell phone to cache corresponding offers, and the cell phone of that same user may later determine that the user is later in the notification geographic location. To this end, cached offers may be updated by the offer management module 40 on each consumer mobile device executing a client offer application associated with a given user profile, such that a given user has a consistent experience across multiple devices.

In another example, the consumer mobile device 14 may be a cell phone that causes a consumer wearable device 22 to display information about offers via a personal area network, such as via a Bluetooth™ network. In some cases, the consumer wearable device 22 is a smart watch or head-mounted display coupled with the consumer mobile device 14 via Bluetooth™ connection, and notifications may be displayed on the consumer wearable device 22, indicating that the user may redeem an offer. In some cases, as noted above, the location of the user may be determined based on the consumer device transmitting a beacon, in which case the beacon may be transmitted by the consumer wearable device 22 or the consumer mobile device 14, which is not to imply that consumer wearable devices are not a type of consumer mobile device.

FIG. 1 illustrates two types of designations of geographic areas, a geofence 16 defined by geographic coordinates and geofence defined by a wireless range 18 (defined in this example by the wireless range of a beacon transmitter 20). In other embodiments, other arrangements may be used to specify geolocation, depending upon a merchant's goals. For example, both of the geographic locations may be geofences or both of the geographic locations may be of the wireless range type. In one example, a mall is ringed with a plurality of beacon transmitters in spaced relation, such that users crossing a perimeter defined by the wireless range of these transmitters may be presented with a notification relating to a given store within that mall. In the illustrated example, the cache geographic location is a geofence 16 and the notification geographic location is a wireless range 18, but those roles may be reversed, again depending upon engineering objectives. In some cases, cached offer is one or both states of a multi-stage geolocation offer, and users are rewarded for moving closer to (e.g., traveling to) a merchant's store, for example. Some embodiments may implement a cache geolocation corresponding to an entrance to a mall or store in range of a Low Energy Bluetooth beacon, with notification geographic locations corresponding to other beacons, QR codes, bar codes, or the like, at various places within the store.

In other examples, the notification geographic location is a location at which the user happens to interact with an offers application on the mobile device, such as when a user pauses to search for offers while in a store. In some cases, in response to a user request for offers, embodiments may search the offer cache for responsive (e.g., in a category or having terms specified by the user in the request), location-relevant offers (e.g., offers corresponding to the store, a location within the store, or within a threshold distance or transit time), and cached offers may be presented to the user (e.g., before or upon determining that the mobile device does not have a data connection or has an impaired data connection).

In some cases, the notification geographic location may be defined, in part, by a negative space within the notification geographic location. The negative space may be a contained geographic location (e.g., in interior concentric circle of the notification geographic location) in which users are not notified of a geolocated offer. Some merchants may wish to avoid sending such notifications to users likely already on their way to a given merchant's physical site without the added enticement of an offer. The negative space may be defined by either the geofence or a wireless range type geographic location, in some cases, the wireless range geographic location defining the reward geographic location.

In some embodiments, the merchants store or other physical site includes a point-of-sale terminal 26 operable to record transactions in, and retrieve data from, a merchant transaction data repository 28. In some cases, as noted above, upon requesting offers, users may be sent information that when presented to a merchant sales clerk, may be used by the merchant sales clerk to provide a benefit specified by the offer when the user redeems the offer (e.g., a validation code unique to that user). In some embodiments supporting single-use offers, after a user claims an offer, the offer management module 40 may generate a unique validation code and store the unique validation code in the corresponding offer instance record. Validation codes may be validated with a number of techniques, including the techniques described above by which the validation code is sent to the offer management module 40, which may respond with an indication of whether the code is valid (e.g., was claimed and has not yet redeemed). In some cases, the offer management module 40 may retrieve an authorization code corresponding to the merchant's point-of-sale terminal 26 from the merchant data repository 34, and that code may be sent for entry into the point-of-sale terminal 26 to authorize conveyance of the corresponding benefit. In another example, the unique validation code may also be sent to the consumer mobile device 14, such that when the unique validation code is presented by the user and entered into the point-of-sale terminal 26, that code may be recognized in the merchant transaction data repository 26 as a valid code and the appropriate benefit may be recorded in the course of redeeming the offer.

The merchant transaction data repository 28 may store data about user transactions with the merchant, including timestamps for transactions, inventories of items or services purchased, prices for purchases, and the like. In some cases, validation codes (which may identify the offer distribution system 12, or other such identifying values) are also stored, such that the merchant can calculate the appropriate amount of compensation for the entity operating the offer distribution system 12 for directing users to the merchant's physical site. Or in some cases, the entity may be compensated based on some other metric, such as an amount of foot traffic directed into a store.

Merchant device 30 represents one or more computing devices of the merchant or merchant employees that may be used to create new geolocated offers. In some cases, merchant employees may log into a web-based interface hosted by the offer distribution system 12 and design geolocation offers according to template stored in the merchant data repository 34. In some cases, merchant employees authenticate themselves using usernames and passwords indicating that the employee is entitled to create offers on behalf of the merchant. In another example, merchant employees may direct the entity operating the offers discovered distribution system 12 to create such offers. As noted above, in some embodiments, the merchant device 30 may be a merchant employee mobile device used to scan a visual display of a validation code and send a request to the offer distribution system 12 to validate the validation code. Thus, the merchant device 30 may be used to determine whether a user is presenting a valid validation code or one that is fake or has already been claimed.

The present techniques are applicable to both single-stage geolocated offers and multi-stage geolocated offers. The latter, being a more complex use case, is described to explain some applicable distribution mechanisms. FIG. 2 shows an embodiment of a process 56 for distributing multi-stage geolocated offers. The process 56 may be performed by some embodiments of the above-described offer distribution system 12, but is not limited to such implementations. In this example, the process 56 begins with obtaining data defining a multi-stage geolocated offer, as indicated by block 58. Next, the multi-stage geolocated offer may be sent to a consumer mobile device, as indicated by block 60. Embodiments may further receive an indication that the consumer mobile device is in the second geographic location of the multistage geolocation offer, as indicated by block 62. In some cases, embodiments determine that the multi-stage geolocated offer has been redeemed based on receiving this indication, as indicated by block 64.

Figure 3:
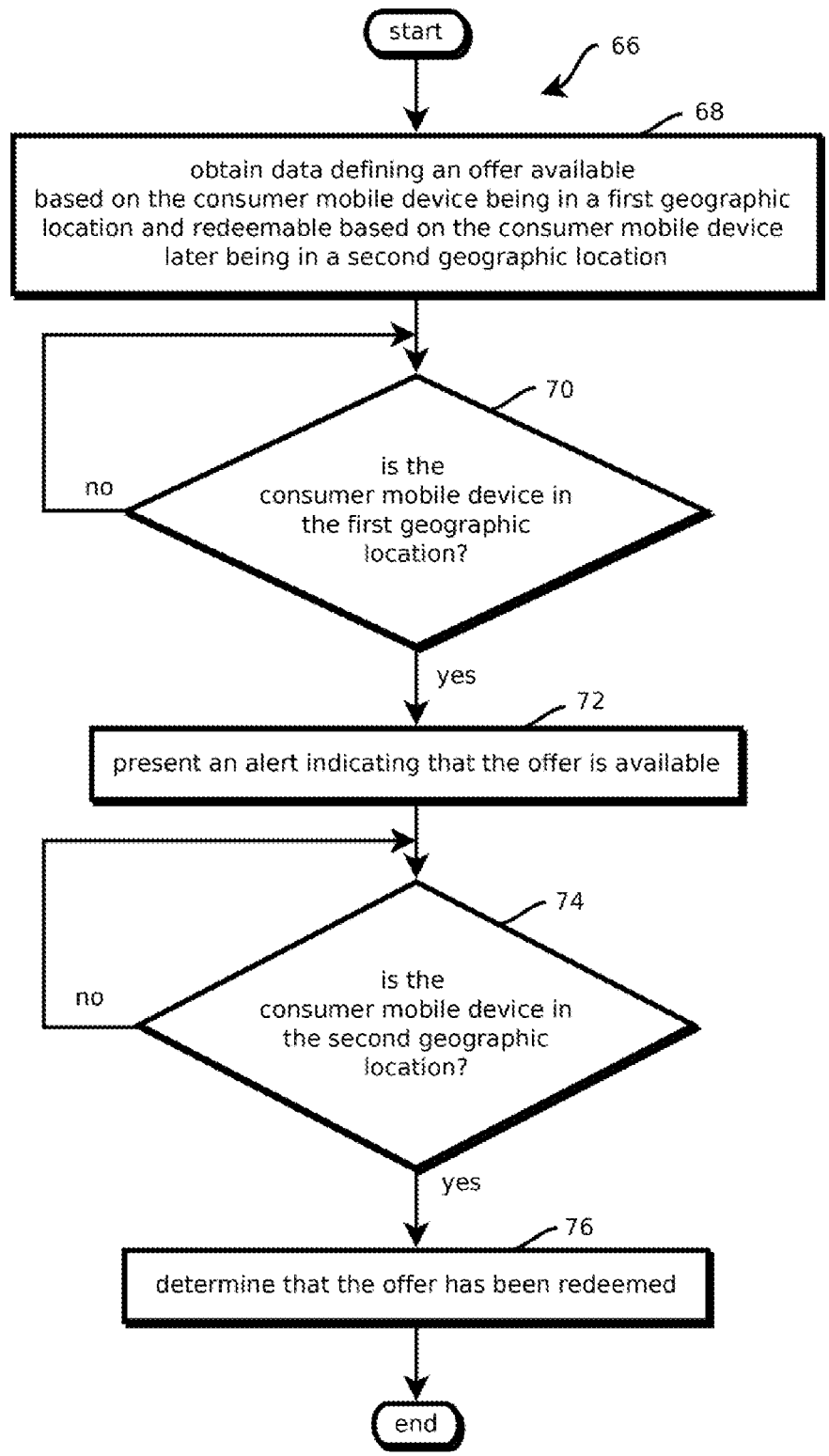
FIG. 3 shows an embodiment of a process for presenting and redeeming multi-stage geolocated offers based on a sequence of geographic locations sensed by a consumer mobile device, such as the consumer mobile devices of FIG. 1.

FIG. 3 shows an embodiment of a process 66 for presenting and redeeming multi-stage geolocated offers. In some embodiments, the process 66 is performed by the above-described client offer application 42 of FIG. 1, but is not limited to those implementations. In this embodiment, the process 66 includes obtaining data defining an offer available based on the consumer mobile device being in a first geographic location and redeemable based on the consumer mobile device later being a second geographic location, as indicated by block 68. Next, embodiments may determine whether the consumer mobile device is in the first geographic location, as indicated by block 70. In some cases, a consumer mobile device may be determined to be in a geographic location in response to the consumer mobile device crossing a geofence, or embodiments may make this determination in response to the consumer mobile device being determined to currently be positioned within a geographic location (which is not to suggest that geofence traversal into the geofence is distinct from being in the geofence, i.e., within the geofence, or at the corresponding geographic location). Upon determining that the consumer mobile device is not in the first geographic location, embodiments may continue to wait until the consumer mobile device is in the first geographic location. Upon determining that the consumer mobile device is in the first geographic location, embodiments may present a notification indicating that the offer is available, as indicated by block 72. In some cases, the notification may indicate to the user that the user will receive a reward in exchange for the user traveling to the second geographic location. Some embodiments may include content with a map illustrating the second geographic location to assist users or request a mapping application on the consumer mobile device to display the second geographic location. Next, embodiments may determine whether the consumer mobile device is in the second geographic location, as indicated by block 74. If the consumer mobile device is not in the second geographic location, embodiments may continue to wait until it is. In some cases, offers may be associated with an expiration time, and embodiments may include a step in which the process 66 is terminated in response to determining that the current time is after the expiration time. Upon determining that the consumer mobile device is in the second geographic location, embodiments may determine that the offer has been redeemed, as indicated by block 76. Redeeming the offer may include determining that the user is entitled to a reward as described above, which may include entering a game of chance, a cache reward, another offer, or the like.

Thus, some embodiments may manage multi-stage geolocated offers. Further, some embodiments may do so in a way that is amenable to operating at the scales frequently presented in commercial offer distribution systems and with the speed and low latency expected by users using such systems. Moreover, some embodiments may implement such offers in a battery-friendly way, and in a manner that is resilient to loss of data signals, such that user experiences with multi-stage geolocated offers are expected to be relatively robust. Again, however, applicants wish to emphasize that the present techniques provide a number of benefits that may be achieved independently and that not all embodiments necessarily provide all of these benefits.

As noted above, some embodiments may cache offers for users to accommodate areas with limited wireless connectivity. Some embodiments may dynamically determine when a geofenced area has no or slow internet connectivity and cache data (e.g., offers related to the area) on mobile devices before the user enters the geofenced area. Mobile network connectivity can often be unreliable, especially in indoor spaces and at large events. In these situations, users are often unable to obtain the desired offer data when they most want to use the data. Some embodiments increase the likelihood of delivery of the desired offer data when users encounter these scenarios. To mitigate this problem, some embodiments may dynamically detect geofenced areas that have limited network connectivity and cache offer data when limited data connection is detected. Some embodiments may also detect when connectivity is reestablished in cached areas and remove the caching designation.

When a device enters a profiled geographic area (defined using one or more of the techniques described above, such as with geofences), some embodiments may toggle a flag within a mobile client application, like those described above, e.g., as part of a background process on the mobile device, to store records of network connectivity issues. In some cases, profiled geofenced areas may be the same as cache geographic areas or a notification geographic area. While in the profiled geographic area, the mobile client application may profile the area by recording data indicative of wireless connectivity issues, e.g., the application may detect that a web request or API request timed out or was slow (e.g., took longer than two seconds to service), and in response create, in local memory, a record of the limited request. Each such record may include a timestamp indicating the time of the limited request, data describing the current geographic location (such as a geofence identifier of the last geofence the user was determined by the application to have entered), information about the mobile device and wireless carrier (like mobile country codes/mobile network codes and related data identifying the carrier and user equipment). The resulting records may be stored in a log on the mobile device. When connectivity returns, an event may be generated (or connectivity may be polled periodically) that causes the application to supplement records for these logged events (e.g., to indicate a difference in location relative to where connectivity was restored, or identify the cell tower or carrier, if such information was not already in memory and used to create the record), and send data on the failed requests. This data may be analyzed by some embodiments of an offer distribution system (like that described above) to determine which cellular (or other) network is having connection issues in which geofence.

Based on the type of the geofenced area and number of failed requests versus number of successful requests (e.g., aggregated across a number of users over time), some embodiments may automatically determine if a geofenced area should be marked as limited for a particular carrier. In some cases, these records may be updated as the wireless environment changes. A geofenced area, in some embodiments, may also recover to full access, e.g., if embodiments detect that the ratio of failed requests to successful requests from a mobile client application to the offer distribution system drops below a threshold.

Some embodiments may designate trouble areas based on other feedback (customer support contact, or other user-imitated contact like a prompt in the mobile client offers application), or manually by hand-coding of geofenced areas, e.g., after sending an employee to walk the area with a collection of handsets from different wireless carriers to test connectivity in the area. In some cases, designations of poor connectivity may be tied to a window of time corresponding to an upcoming event. For example, some embodiments may geofence (or otherwise designate an area of) a music concert or a sporting event at a large stadium based on the expectation that connectivity will be poor, and embodiments may determine that the corresponding window of time is occurring and in response mark the area as such so that users are less likely to have problems.

Once an area is marked as having limited connectivity, some embodiments may automatically trigger caching of coupons (or other offers) for stores within the geofenced area. When a matching device (e.g., on the carrier associated with the geofence for carrier-specific geofences) enters the geofenced area (for example, the parking lot of a mall that has poor connectivity), the offer distribution system may push a dynamically generated, compressed coupon data package to the application, in some embodiments. This data may contain information needed to search for and redeem deals inside the geofence without sending requests to a remote server at the time of offer discovery (e.g., due to automated notifications or user interactions, like searching for offers, in an offers application on the mobile device) by the user or at the time of offer redemption. Some embodiments may store the data as a preloaded cache of API responses from the offer distribution system. Some embodiments may cache a smaller (e.g., lower image resolution, or image-less content) set of data that can drive an alternate display when richer content is not available. Some embodiments may cache data containing a collection of stores and coupons, where some coupons are described by records containing barcode text, a barcode type, and active time range.

The application executing on the mobile device, in some embodiments, may then store this cache until the application determines the cache, or entries in the cache, expire, e.g., either at a pre-determined time or at a set amount of time after the user exits the geofence. To reduce bandwidth and storage consumption, particularly for offers cached but never seen by the user, some embodiments may render barcode images with the mobile client application based on barcode code numbers (e.g., text) held in cache, rather than sending images of the barcodes. Or some embodiments may render QR codes natively in the application using a similar technique for similar purposes.

While within the geofenced area, some embodiments of the mobile client application may still attempt to fetch the data from the remote offer distribution system wirelessly. However, the application may determine that it is in a user limited network area and, in response, may render the cached coupon data first and network data may be used as a backup, e.g., to supplement or update the cached data after the cached data is presented to the user.

This caching technique is not limited to areas with poor connectivity. Some embodiments may use this technique to reduce response times to likely user interactions. Some embodiments may cache when the offer discovery system or offers application determines a user is likely (e.g., more than a 0.1% probability) to view or redeem a given offer based on a user's profile and attributes of the offer. Upon such a prediction, the offer may be pushed to (or pulled by) the offers application executing on the mobile device. Additionally, some embodiments may cache offers the user has looked at recently (e.g., in response to a user viewing them within a threshold duration of time).

Some embodiments may cache single-use offer codes, which in some implementations, are more complicated to implement than non-rivalrous unlimited use codes. When cached, single-use codes may be marked in records of the offer distribution system as reserved while cached on the user device. In some cases, the single use codes may be deemed used by the offer distribution system when the mobile client offers application marks the code as used in a log of the transaction and later sends that information to the offer distribution system upon connectivity being determined to have returned of the application. In a network limited geographic area, this may happen when the user exits the geofence. Otherwise, in some embodiments, the reserved code may be designated as returned to the available state when the user exits the geofence, in response to an indication of non-use from the application to the offer distribution system upon the return of connectivity being detected.

Additionally, some embodiments of the mobile offers application may automatically change the reserved codes to available based on a time decay algorithm. Some embodiments may take steps to prevent leaking of the codes out through the offers application, e.g., by encrypting the code in memory, or preventing single use codes from caching on jailbroken phones, and the mobile application may determine that once the time decay has passed, the application should not display the code, even if the user is still inside the geofence. Some embodiments may reserve codes for users entering a geofence if the remaining code count is over a certain threshold, as determined by the offer distribution system. Some embodiments may cache a portion of data about the offer but exclude the validation code until the time of redemption, allowing embodiments to transfer less data for the user to redeem the single-use offer.

Some embodiments may log a variety of different types of data on the mobile device while connectivity is impaired. In addition to sending a report about having a poor connection back to the offer distribution system, some embodiments may log analytics requests that failed to send and batch them for sending when the mobile device regains connectivity. Some embodiments may use this data to determine which offers (or types of offers) the user tried to open or request while inside the geofence, and in response, prioritize caching those items for future users. For example, in a mall with store A but no store B, many users may want to check if store B has a better coupon, even though the nearest store B is a few miles away. Some embodiments may use resulting analytics data to determine to deliver store B offers to mobile devices entering the geofence even though there is no store B inside. If there are too many offers available inside a geofence to cache all potentially relevant content, some embodiments may also use other information in a user profile (including offer views, store favoriting, or offer saves) to score, rank, and threshold which offers are sent to be cached, to avoid wasting mobile-device battery power, memory, and bandwidth by caching offers the user is unlikely to use.

The above caching techniques may be implemented in a variety of different ways. Representative examples are described with reference to FIGS. 4 through 7. These figures depict examples of processes that are performed by some embodiments of the above-described offer distribution system 12 and the client offer application 42 shown in FIG. 1, but embodiments are not limited to those implementations.

Figure 4:
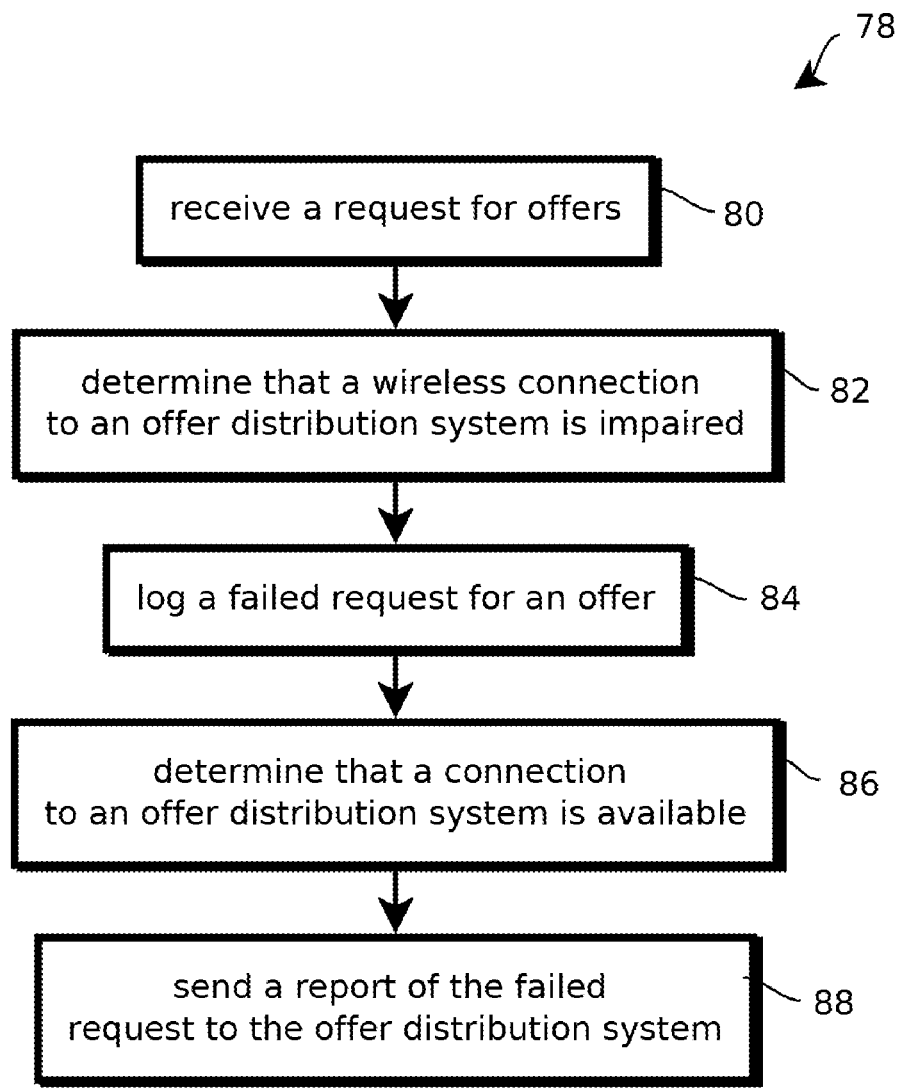
FIG. 4 shows an example of a process performed by some embodiments of a client application to log instances in which requests for offer content fail.

FIG. 4 shows an example of a process 78 performed by some embodiments of a client offer application to log the geographic location of impaired or failed sessions with a remote offer distribution system, e.g., due to poor wireless connectivity in the geographic area. In some embodiments, the process 78 includes receiving a request for offers, as indicated by block 80. Receiving a request for offers may include receiving via a touchscreen of a mobile device, such as a cell phone, user selections within an offers application that indicate the user is requesting to view offers. In some cases, the request includes criteria for selecting the offers specified by the user input, such as a request to search for offers related to a particular store, a particular geographic area, a particular category of merchandise or services, or a particular type of discount.

In other examples, receiving a request for offers may include receiving a function call from an event handler that automatically requests geographically relevant offers in response to an event indicating the user's mobile device has entered a notification geofence. For example, some embodiments may register a plurality of geofences (such as a plurality of geofences within some threshold distance of the user to conserve battery life by avoiding monitoring for geofences over areas that are likely irrelevant) with a library or framework provided by an operating system of the mobile device (or other service, such as the service provided by Gimbal, Inc. of San Diego Calif.), and some embodiments may direct that library or framework to send signals to an offers application indicating when a user has entered one of the geofences and identifying which geofence, for example by a geofence identifier. Offloading this task to the operating system, in some embodiments, may help conserve battery life, as a plurality of applications executing in the background on consumer mobile devices may have similar needs, and sharing the task of detecting geofence entry among the plurality of applications is expected to be less power intensive than having each separate application duplicate this task (though not all embodiments employ this technique). In some cases, geofence-related events, or user input, may cause a client offers application to select or otherwise compose an API request to the offer distribution system, such as a request for offers satisfying various criteria corresponding to the event or input, such as search criteria, offers related to the geofence identifier, or the like.

Next, some embodiments may determine that a wireless connection to an offer discovery system is impaired, as indicated by block 82. In some embodiments, the determination may be made by determining that an API request sent to the offer distribution system, or requested by the client offer application to be sent by the operating system, is taking longer than a threshold amount of time to receive a response, such as a complete response, from the offer distribution system. In another example, some embodiments may query the operating system of the consumer mobile device for a current state of the wireless connection and determined based on responsive data whether such a connection exists. To be clear, the entirety of the connection to the offer distribution system need not be wireless, and in many cases a first segment of the connection may be wireless, such as from a mobile handset to a cellular base station, while other segments are wired, such as from the cellular base station to the offer distribution system. In these examples, an impaired connection between a consumer mobile device and a cellular base station (or other wireless access point) can cause the determination of block 82 to be made, notwithstanding a fully functional wired connection along the remainder of the route.

In response to the determination of block 82, some embodiments may log a failed request for an offer, as indicated by block 84. In some cases, a failed request for an offer may include a request to establish a networking session by which such a request is to be sent, and the request itself need not necessarily be sent if a precondition for sending the request fails, such as a stage of the transmission control protocol (TCP) three-way handshake. In some cases, the failed request may be logged in persistent memory of the consumer mobile device that is accessible to the client offer application 42. In some embodiments, the failed request may be logged in persistent client-side browser accessible memory in the case of a mobile web application, for example, in a LocalStorage object key-value pair, a web SQL database, or an indexed database, such as in an ObjectStore, or in a FileSystem object created by a client-side web browser. In another example, the log may be created by a native offers application operating outside of the security sandbox that constrains typical web applications. In some cases, the log may be created in a database or document for subsequent retrieval.

In some cases, a log of failed requests may be maintained by the client offers application over time, and the log may include a plurality of failed request records. Each record may include a timestamp indicating when the failed request occurred, a geolocation (such as a latitude and longitude and confidence value, a geofence identifier, or beacon identifier in range), a description of the request (such as the text of an API request), a description of the failure (such as an indication of whether the content never arrived or the content arrived but took longer than a threshold amount of time), and a description of the state of wireless connections of the mobile device at the time of the request (such as the type of wireless connection through which the attempt was made, for instance, via a cellular connection or Wi-Fi™, and a signal strength or connection quality, like a signal-to-noise ratio, experienced by the consumer mobile device at the time of the request). The records may also be associated with a description of the consumer mobile device, such as an identifier of the cellular carrier and an identifier of a mobile handset model. In some cases, each record may be associated with a value indicating whether the record has been sent to the offer distribution system, and this value may be initially set to indicate that the record has not been sent. In some cases, a plurality of such records may accumulate before wireless connectivity is restored.

Next, some embodiments may determine that a connection to an offer discovery system is available, as indicated by block 86. In some cases, the offer discovery system may encompass multiple domains, and a connection to a domain through which log reports are sent is established while a connection to another domain through which offers are requested is not, in which case some embodiments may deem the connection to have been reestablished for purposes of the process 78. In some cases, the determination may be made by a background process of the client offer application that periodically polls the operating system for a state of the wireless connection, or such a background process may periodically attempt to communicate with the offer distribution system, for example, with a heartbeat signal, and upon successful communication, this background application may deem the connection reestablished. In another example, the connection may be determined to be reestablished upon a user interacting with the client offer application, such as by requesting a mobile webpage from the offer distribution system or by launching a native offers application, and successful exchanges over the network may indicate the return of a connection.

Some embodiments may determine whether a particular type of connection is available for purposes of step 86. For example, some embodiments may conserve a user's cellular data bandwidth by disregarding cellular connections for purposes of reporting logs until a Wi-Fi™ connection is established. Or some embodiments may disregard cellular data connections until more than a threshold amount of time or amount of data has accumulated, favoring Wi-Fi™ connections before the threshold.

Upon determining that a connection is available, and in response, some embodiments may send a report of the failed request to the offer discovery system. Some embodiments may query or otherwise iterate through a log of failed requests and select those records associated with a value indicating the record has not yet been sent to the offer distribution system. In some embodiments, the selected reports may be sent to the offer distribution system. In some cases, the failed reports may be sent a substantial amount of time after receiving the documented requests for offers, such as more than 10 minutes later or more than a day later.

Figure 5:
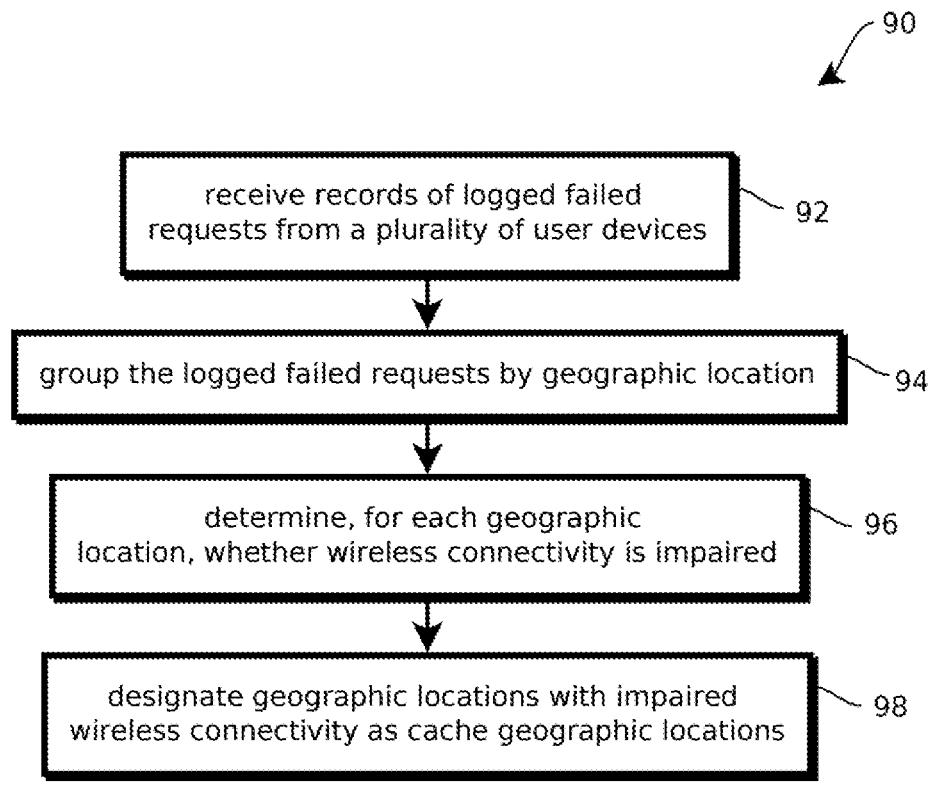
FIG. 5 shows an example of a process performed by some embodiments of an offer distribution system to gather reports of failed requests for offer content and designate geographic areas for predictive caching of offers.

FIG. 5 shows an example of a process 90 performed by some embodiments of an offer distribution system to identify geographic areas with poor wireless connectivity based on reports of failed content requests from a plurality of user devices. In some embodiments, the process 90 includes receiving records of failed requests from a plurality of user devices, as indicated by block 92. In some cases, a relatively large number, such as millions, of consumer mobile devices may perform the process described above with reference to FIG. 4. In some embodiments, log reports from those mobile devices may be collected by an offer distribution system. In some cases, the collection may occur over some duration of time, such as until a threshold amount of reports have been received, until the reports in the aggregate indicate conditions have changed in some areas, or until some fixed duration of time has elapsed, like 24 hours, a week, or a month, depending upon trade-offs between responsiveness and use of computational resources. In some cases, the records may be received from consumer mobile devices distributed over a relatively large geographic area, such as the United States, North America, or the world.

In some embodiments, the process 90 includes grouping the failed requests by geographic location, as indicated by block 94. In some cases, the received records include an identifier of a geofence, and the records may be grouped according to geofence, with each group corresponding to a given geofence, or in the case of nested geofences, multiple geofences. In other examples, geographic areas may be segmented according to the geolocations in the records, for example, by clustering according to geolocation. Some embodiments may execute a density-based clustering algorithm, like DBSCAN, to establish groups corresponding to the resulting clusters and exclude outliers. In some embodiments, records may be grouped with the above-described geohashing techniques, e.g., grouping records having geohashes with matching, more-significant digits, for instance, by rounding geohashes, or truncating less significant digits from geohash values, and grouping records having the same rounded or truncated values.

To cluster according to geolocation, some embodiments may iterate through each of the geolocations reflected in the records and designate a geolocation as a core geolocation if at least a threshold number of the other geolocations in the records are within a threshold geographic distance. Some embodiments may then iterate through each of the geolocations and create a graph of reachable geolocations, where nodes on the graph are identified in response to non-core corresponding geolocations being within a threshold distance of a core geolocation in the graph, and in response to core geolocations in the graph being reachable by other core geolocations in the graph. In this context, geolocations are reachable from one another if there is a path from one geolocation to the other geolocation where every link and the path is between core geolocations, and those core geolocations are within a threshold distance of one another. The set of nodes in each resulting graph, in some embodiments, may be designated as a cluster, and points excluded from the graphs may be designated as outliers that do not correspond to clusters. In some examples, the location in the records may be indicated by an identifier of a wireless transmitter, such as a cellular tower identifier, or a service set identifier of an in-store Wi-Fi network, and embodiments may group the failed requests according to this identifier, such that each group of records has the same identifier.

In some embodiments, the received records may be grouped according to both geolocation and time to capture transient events with higher temporal fidelity than systems that analyze records without regard to time. By grouping by time and location, some embodiments may establish groups corresponding to events, such as the location of college sports stadiums during weekends in the fall, indicating poor wireless reception due to large numbers of users overwhelming cellular networks. In other examples, some embodiments may filter the records according to time, for instance, discarding or disregarding records older than a threshold age, such as older than one week, or older than one month, depending upon desired responsiveness and statistical power.

Alternatively or additionally, some embodiments may group the received records according to a cellular service provider identified in the records to establish groups corresponding to areas in which a given service provider has poor wireless connectivity while other service providers may have adequate wireless connectivity. In another example, some embodiments may group the received records according to handset model to identify areas in which a given model of handset has worse wireless connectivity than other handsets, for instance, those having more robust antennas. Some embodiments may compose a vector from scalar values reflecting each of latitude, longitude, time, cellular carrier, and handset model and, then, cluster the resulting vectors using the techniques described above to establish groups indicative of a temporal, carrier-specific, handset-specific geographic areas in which connectivity is problematic.

Some embodiments may then determine, for each geographic location, or group, whether wireless connectivity is impaired based on the amount of records, as indicated by block 96. For example, some embodiments may determine whether a given group has more than a threshold amount of records, where the amount is, for instance, a frequency or count, and the threshold is selected according to trade-offs between the risks of over caching and false negatives. In some cases, the threshold may be calculated based on a total amount of requests for offers within the geographic area corresponding to the group, as some particularly high-traffic areas may have a relatively large number of failed requests that represent a relatively small proportion of the total amount of requests. In some cases, the total amount (which may be estimated based on a sampling of the area) may be calculated based on a logged successful request for content or by including an identifier of the geographic location in a received request for content and accumulating the total from received requests that are successfully serviced. Some embodiments may also account for use of offers in a larger geographic region, e.g., by determining not to cache offers in response to determining that the offer has been used less than a threshold amount in the region.

In some cases, the records may be scored differently depending upon the severity of the impairment, for instance, with complete failures to provide content scored as 1 and slow responses for request for content scored as a 0.5. In these examples, the score may be compared to a threshold to determine whether connectivity is impaired. In another example, determining whether a wireless connectivity is impaired for the group may include calculating a score for the geographic area indicative of problematic wireless connectivity, for instance, a ratio of the above describes score and a total amount of traffic. Some embodiments may determine whether to cache offers for the geographic area based on this resulting score and other parameters, such as an amount of battery power remaining on a given user device as indicated in the request from the user device for cached offers or a predicted likelihood that a user will redeem an offer that would otherwise be cached.

In response to determining that a geographic location has impaired wireless connectivity, some embodiments may designate those geographic locations as cache geographic locations, as indicating by block 98. Such a designation may be a binary flag that is associated with a record of the corresponding geolocation in memory, with a value of true indicating that connectivity is poor and offers are to be cached, and a value of false indicating the opposite. In other examples, the designation may be a score associated with the geographic area, with the score serving as one of several inputs into a determination of whether offers are to be cached in a given instance for a given context.

Figure 6:
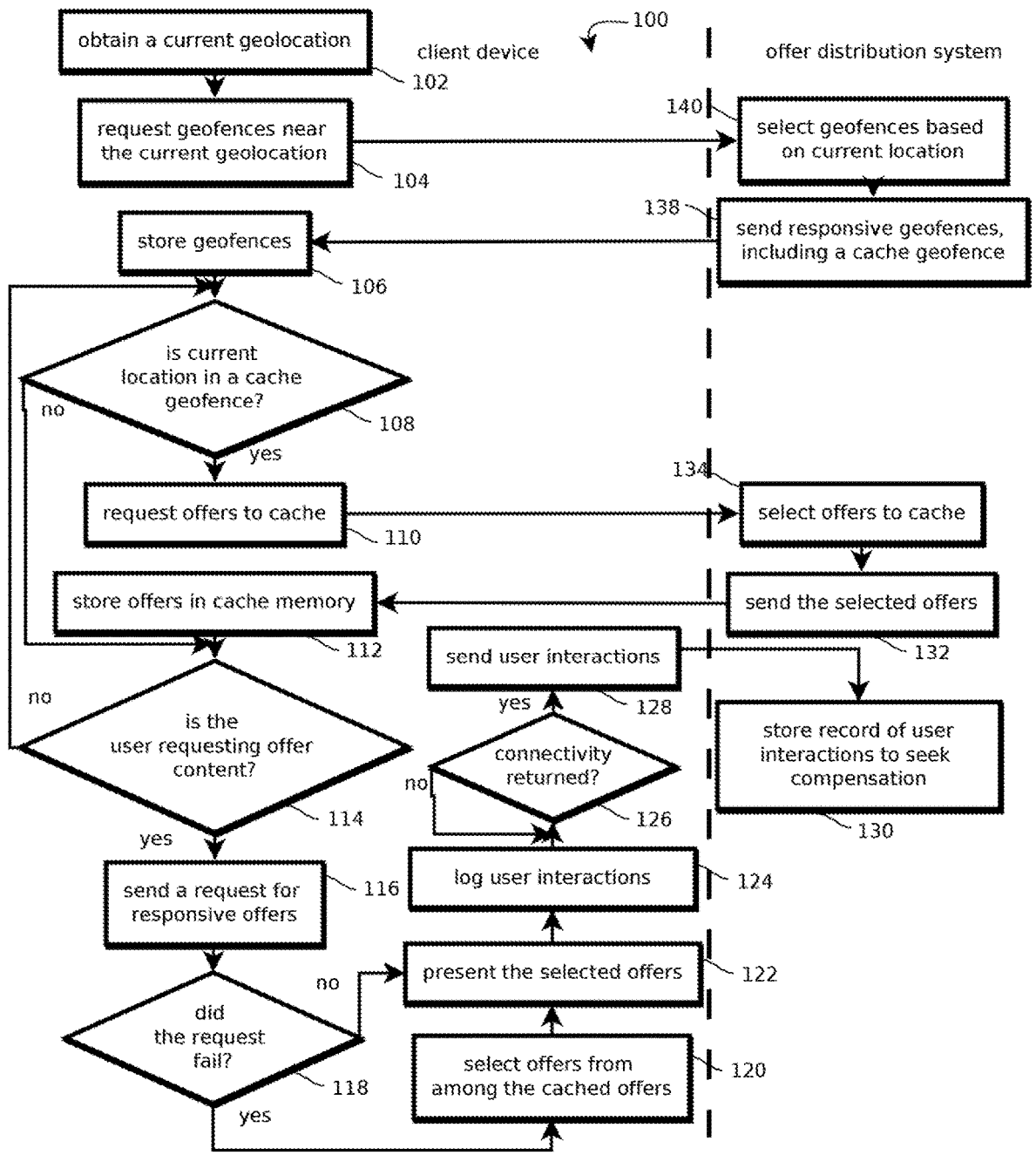
FIG. 6 shows an example of a distributed computing process performed by some embodiments of client devices and offer distribution systems to cache geographically targeted offers.

FIG. 6 shows an example of a process 100 that may be performed by parts of the offer discovery system 10 described above to predicatively cache locally relevant offers on consumer mobile devices entering previously designated cached geographic areas. In some cases, the cached geographic areas may be identified with the techniques described above with reference to FIGS. 4 and 5. In some cases, the cached geographic areas may be identified well in advance, such as more than an hour or more than one week, of performing the process of FIG. 6, as identifying cached geographic areas may be relatively computationally complex and slow relative to the window of time in which offers are to be cached. FIG. 6 shows a dotted line with a client device on one side and offer distribution system on the other. Steps performed by these respective components are positioned on the corresponding side of the dotted line. The client device may be the consumer mobile device 14 described above with reference to FIG. 1.

In some embodiments, the process 100 begins with the client device obtaining a current geolocation of the client device, as indicated by block 102. In some cases, the current geolocation may be obtained upon an event being created by a geolocation library or framework that indicates the client device has moved more than a threshold amount, such as more than 1 km or has changed cellular towers, to conserve battery life and excessive polling of a global positioning system unit or other geolocation system on the client device. (Though it should be noted that embodiments are consistent with more battery intensive techniques, for instance to favor faster response times and higher fidelity to location.) In some cases, the current geolocation may be obtained by a background process of the client offer application that subscribes to the library or framework to receive such events.

Next, some embodiments may request geofences near the current geolocation from the offer distribution system, as indicated by block 104. In some cases, the request may be a request executed by the background process in the form of an API request for geofences within some threshold distance of the current geolocation. In some cases, the threshold distance may be relatively large, for instance encompassing an entire city or state in cases in which geofences are relatively low density relative to the processing capabilities of the client device. Such distances may be calculated with a variety of techniques, for instance, relative to a centroid of the geofences, or in some cases, the geofences may be obtained based on being grouped with a larger geographic area in which the client devices currently located, for instance, in the western half of the United States.

Upon receiving the request, some embodiments of the offer distribution system may select geofences based on the current location reflected in the request, as indicated by block 140. As noted above, the geofences may be encoded in a variety of formats, for instance, a center point and radius or a polygon with vertices corresponding to a latitude and longitude. In some cases, the obtained geofences may be associated with values that indicate the purpose of the geofence. Some obtain geofences may be designated as cache geofences, for instance, responsive to the processes described above with reference to FIGS. 4 and 5, and some geofences may be designated as notification geofences. Cache geofences may correspond to geographic areas in which offers are to be predicatively loaded to compensate for poor wireless connectivity in the geographic area, and notification geofences may be geographic areas in which users are notified of offers in response to the user being in the area, for instance, automatically upon detecting that the client device is in the notification geographic area. In some cases geofences (or other designations of geographic areas) are labeled as both cache geofences and notification geofences, and the user is notified of the offer, but additional content relating to the offer (such as images and a fuller description) is held in cache memory in case the user elects to engage with the offer, for instance, by selecting the notification. The responsive geofences, which may include a cache geofence, may be sent to the client device, as indicated by block 138.

Upon receiving the geofences, they may be stored by the client device, as indicated by block 106. Storing the geofences may include instructing a geolocation framework or library of the client device to begin monitoring whether the client device is currently within one of the received geofences. In some cases, the request for monitoring may identify a desired accuracy, such that the process may be de-tuned to save battery life. In some cases, all of the received geofences may begin to be monitored, or some embodiments may begin monitoring only a subset, such as those within a threshold distance of the current location. In some embodiments, upon receiving the geofences, other geofences that were not among those received may be removed from the set that the client devices currently monitoring to conserve battery power.

Next, some embodiments may monitor (e.g. periodically or in response to some event, such as changing cell towers or moving more than a threshold distance) whether the client device is in a cache geofence, as indicated by block 108. Such monitoring may be performed with any of the techniques described above for determining whether a client device is in a designated geographic area. Upon determining that the current location is in a geofence being monitored and that that geofence was labeled by the offer distribution system as a cache geofence, some embodiments may request offers to cache, as indicated by block 110. In some embodiments, the client device may allow the user to initiate the request that offers be cached, even if the user is not within a geofence. For instance, the client offers application may present a user interface input that, when selected by a user, causes the client offers application to acquire the device's current geolocation and submit a request for offers to cache related to that geolocation, e.g., potentially relevant offers within some threshold distance, or such offers related to areas within that distance that are known to have poor wireless connectivity. In some cases, the offer distribution system, upon receiving such a request, may select responsive offers, and send those offers to the client device, which may store the received offers in cache memory. When selecting offers, some embodiments may rank offers based on past user interactions indicative of interest in a geographic area. For instance, some embodiments may store a history of user map searches (e.g., a log of map extents in which the user selected, viewed, or requested content, or geographic terms in map queries) and weight offers in geographic areas according to whether those offers pertain to locations in the map searches, for instance, based on how large the map extent is, and how frequently the area appears in the map extent, up-weighting location matches more heavily in map extents that are relatively specific and relatively frequently interacted with. Offers may be ranked based on weighted relevancy scores or distance, in some embodiments.

In some cases, determining that the user is in the cache geofence may include determining that the user has entered the cache geofence. For instance, some embodiments may determine at a first time that the user is external to the cache geofence and, then, at a second time, that the user is within the cache geofence, to initiate a request for offers to cache. Some such embodiments may subsequently determine that the user is still in the cache geofence and, in response to the earlier determination, not issue another request for cached offers to reduce bandwidth and conserve batter life.

Upon receiving this request, some embodiments of the offer distribution system may select offers to cache, as indicated by block 134. In some cases, the request includes an identifier of the cache geofence or a more precise current location of the client device, and these values are used to select offers to cache based on geographic location. For instance, periodically after creating a cache geofence, some embodiments may preselect offers corresponding to the geographic area to favor relatively low latency responses to the request while still updating the offers to reflect changing merchant and user preferences. Or some embodiments may select offers in response to receiving the request, e.g., to account for attributes of the user in the user's profile.

Offers may be selected based on a variety of criteria to serve a variety of different objectives and satisfy a variety of different constraints. For instance, offers may be selected based on a predicted likelihood of the user requesting the offer, to increase the likelihood that a requested offer is available for the user regardless of wireless connectivity, to increase user perception of reliability of the offer application, and to increase usage generally. In another example, offers may be selected based on a predicted likelihood of the user redeeming the offer and the predicted affiliate payment to increase revenues in areas with poor wireless connectivity. Or some embodiments may accept both of these inputs and provide a blended selection that balances between these objectives (e.g., calculating a weighted sum score for each offer and selecting according to rank). Such predictions may be based on records of past user interactions with offers and patterns in those records that correspond with the current context. For instance, offers that were requested or redeemed more frequently than a threshold amount by users having a similar user profile to that of the user associated with the client device may be selected. Or offers that were previously redeemed or requested more frequently than a threshold amount in the geographic area, for instance, during the same day of the week or times of year, may be selected. Some embodiments may construct a predictive model, such as a neural net, based on each of these inputs to select offers. Some embodiments may train such a model based on past user requests and redemptions according to a gradient descent algorithm, such as a stochastic gradient descent, and the current context may input into the model to select the offers to cache. In some cases, the selected offers are single-use offers, in which case the process of FIG. 7 may be performed in conjunction with these techniques.

Next, some embodiments may send the selected offers to the client device, as indicated by block 132. In some cases, the selected offers may be preprocessed to account for the lower-likelihood of being used relative to offers requested by a user. For instance, some embodiments may provide a downgraded experience that uses less bandwidth and memory as a backup to the user experience in which wireless connectivity is present. For example, some embodiments may retrieve a subset of an offer record that describes a given offer and is less than what is sent to a user using a device that has wireless connectivity. Some embodiments may omit images, or just those that are relatively large consumers of data. In another example, some embodiments may omit images of barcodes (e.g., one-dimensional barcodes or two-dimensional barcodes, like QR codes), and a corresponding barcode number and barcode type (e.g., indicating that a QR code or other type that is to be used) may be sent to the client offer application, which may include a module configured to generate an image of the specified barcode based on the number and barcode type, thereby avoiding transmitting a relatively data intensive image of a barcode. In another example, the selected offers may be compressed and transmitted in a compressed data format before being decompressed client-side for usage.

In some cases, before transmission, the offers may be associated with API requests or parameters for such requests to which the offers pertain. For instance, some embodiments may determine that users are relatively likely to request or redeem offers relating to the category of sporting-goods while in a particular area of the cache geofence (e.g. a notification geofence), and the corresponding offers may be selected in view of this and associated with API requests for offers in the category of sporting-goods or offers from a merchant in the category of sporting-goods retailers.

Before transmission, the offers may also be associated with geolocations within the cache geofence, such as a notification geofence, or a latitude and longitude of a merchant store at which the offer is redeemable. These geolocations may be processed by the client device when selecting offers in the absence of wireless connectivity, for instance, by ranking offers in cache memory according to distance from the users current location, or to provide automated notification of offers pertaining to a particular wireless beacon encountered by the client device. In some cases, the selected offers may be organized in a database file that, when loaded in the client device, is responsive to various queries composed client-side based on user requests for offers, such as an indexed database. In some cases, prior to sending, some of the selected offers are associated with an expiration time, which may be enforced by the client device to avoid presenting offers that have expired during the period in which the user is without wireless connectivity.

Upon receiving the offers, the client device may store the offers in cache memory, as indicated by block 112. Cache memory may include any of a variety of different types of client-side memory and is not limited to cache memory in the context of a central processing unit, such as L2 cache. In some cases, compressed binaries of offers may be decompressed to facilitate relatively fast interrogation of the collection of offers in response to later requests for offers by the user.

Next, and potentially repeatedly for several hours or days in the future, some embodiments may determine whether the user is requesting offer content, as indicated by block 114. Request for offer content, as noted above, may include a user interacting with the user interface of a client offer application, e.g., to search for offers redeemable near (e.g. within a threshold distance or ranked in order of distance from) their current geolocation, or to view offers in various categories. Or requesting offer may include a background process of a client offers application detecting an event indicating proximity to a geolocation at which a notification is to be presented to the consumer, such as presenting a notification on a lock screen of a cell phone (or on a wearable device)

indicating that an offer is redeemable in response to detecting an identifier of a transmitter in range corresponding to the offer.

As noted above, the notification geofence may be smaller than the cache geofence, and in some cases multiple notification geofences may be disposed in the cache geofence. For instance, the cache geofence may encompass a larger area having multiple pockets of poor wireless connectivity. In some cases, the cache geofence may be sized such that a buffer region is present around notification geofences to allow time for caching to occur while a user travels further into a cache geofence, like a cache geofence at a 2-mile radius around a mall, with a notification geofence at a 1-mile radius around the mall.

Or requesting an offer may include a user selecting such a notification and requesting to view a fuller description of an offer corresponding to the notification. Upon determining that user is not requesting offer content, some embodiments may return to the determination of block 108. Upon determining that the user is requesting offer content, some embodiments may proceed to the steps described next.

Some embodiments of the client device may send a request for responsive offers, as indicated by block 116. Sending a request for responsive offers may include attempting to wirelessly send, or successfully wirelessly sending, a request to the offer distribution system. And some cases, sending a request for responsive offers may include querying an operating system of a consumer mobile device for a current state of a wireless connection to determine that such a request cannot be sent, even if the request is not sent due to the operating system indicating that a wireless connection is lacking.

Next, some embodiments may determine whether the request of block 116 failed, as indicated in block 118. As noted above, a failed request may be indicated by the operating system signaling an offer application that wireless connectivity is unavailable (or connectivity generally to a network is unavailable). In some cases, a request for offer content may be transmitted or partially transmitted, but a response, such as a full response, from the offer distribution system may not be received within a threshold duration of time, in which case some embodiments may determine that the request failed. In some cases, requests may be identified as failing in different ways, such as failing due to a request not being sent because of a lack of network connections, failing due to a request being sent but a full response not being received, or failing due to a request being sent and a full response not being received within a threshold duration of time, such as within 2 to 5 seconds, depending upon trade-offs between over caching and presenting higher latencies to users. Upon determining that the request did not fail, some embodiments may proceed to present the selected offers, as shown in block 122 and described below. Upon determining that the request did fail, some embodiments may proceed to the step described next.

In response to a failed request, some embodiments may select offers from among the cached offers received in step 112, as indicated by block 120. In some cases, offers may be selected from among the cached offers using the same or a subset of the techniques with which the offer distribution system selects offers in response to user requests. In some cases, an API request that remains unserviced from step 116 may be compared to the text of API requests associated with the offers in the cache memory, and offers having the same API requests associated with the offer may be selected. (In some cases, a single offer may be responsive to multiple API requests, and the association may be in the form of a list of offer identifiers associated with each API request, with some offer identifiers appearing in multiple lists of multiple API requests.)

In some cases, a response may be approximated. In some embodiments, a request in step 116 may be less specific than an API request stored in cache memory, in which case each of a plurality of more specific API requests stored in cache memory may be identified (if available), corresponding offers may be de-duplicated, and the resulting offers may be selected. Relative specificity and generality may be determined based on parameters of the requests, e.g., based on species genus relationships in an ontology of offers, based on one request having a subset of keywords to search by relative to those in another request, or based on varying granularity in specification of geographic areas.

In another example, a request in step 116 may be more specific than an API request stored in cache memory, in which case some embodiments may identify the closest, more-general API requests from among the API request stored in cache memory, and the corresponding offers may be selected. In some cases, the corresponding offers of the more general API requests may be filtered according to the criteria specified in the request from step 116, for example, selecting offers that include a keyword specified in the request from step 116 or selecting offers associated with a subcategory identified in step 116 of a category specified in the more general API request.

In some embodiments, the offers may be stored client-side in a relational database, and a query corresponding to the request from step 116 may be submitted to the database on the client device by the offer application. In some cases, none of the offers in cache memory may be responsive, in which case a message to the user may be presented indicating that wireless connectivity is preventing a response. In some cases, more than a presentation threshold amount of offers may be selected, in which case the offers may be ranked, e.g., based on geographic distance to the user, an amount of discount, a predicted amount of affiliate compensation, or a predicted likelihood of redemption, and offers ranking above the presentation threshold may be presented while offers below the presentation threshold may be withheld from the user.

Next, some embodiments may present the selected offers, as indicated by block 122. Presenting the selected offers may be performed in a variety of different ways. In some cases, the offers may be presented in ranked order. In some cases, the offers may be presented on the consumer mobile device. In other cases, the offers may be presented on another device carried with the user, such as a wearable consumer device, like a smart watch or a head-mounted display. Or the offers may be presented on an in-dash car computer or an in-store kiosk (like a tablet computer attached to a merchant's fixture). In some cases, the consumer's mobile device may instruct these other proximate computing devices to present the offer via a Bluetooth™ connection, a Wi-Fi Connection™, or the like. In some cases, the offer may be presented multiple times, for instance, initially as a notification on a consumer mobile device, and then on a full-screen display of an offers application (e.g. a web application or a native application) launched in response to the user selecting a notification. In some cases, one of the presentations of the offer includes a scannable code (like a barcode) that when scanned by a point-of-sale terminal indicates that the user is entitled to redeem the corresponding offer.

In some cases, a portion of offer content required to redeem an offer, such as a redemption code, is withheld from the cache, and a relatively low-data-intensive request for the redemption code, which is often relatively small portion of the description of an offer, is sent to the offer distribution system. Often areas with poor wireless connectivity still support relatively low-bandwidth transmissions of data, such as those of a redemption code that exclude a substantial amount of, or all of, the remaining content by which an offer is presented to a user. Withholding the offer code is expected to enhance tracking of user redemption of offers, facilitating more accurate payments from merchants to those operating affiliate networks and publishers at the risk of some offers going unredeemed due to zero wireless connectivity.

Some embodiments may log user interactions with an offer, as indicated by block 124. In some cases, the log may be maintained in memory of the client device and held until wireless connectivity returns and the information can be sent to the offer distribution system. Some embodiments may log records of a user being notified of an offer, a user requesting offers, a user being presented with displays of an offer, and a user requesting a display of an offer that includes a redemption code, such as a barcode or a text code that can be scanned or typed into a point-of-sale terminal.

In some embodiments, the presentation of an offer that includes such a code may be sequenced such that the user first views a description of the offer without the code and, then, the code is displayed in response to a user request (e.g., selecting an on-screen button) to view the code. Staging the code presentation in this fashion is expected to yield relatively accurate records that distinguish between offers that were merely viewed and offers that were more likely to have been redeemed. The more accurate data may be used to seek more accurate compensation of affiliates and publishers from merchants than is available through some conventional systems. In some cases, each logged user interaction may be associated with a geolocation and the timestamp for accumulating metrics that demonstrate value to merchants.

Next, some embodiments may monitor whether connectivity has returned, as indicated by block 126. This step may be performed with the techniques described above with reference to step 86 of FIG. 4.

Upon determining connectivity has returned, some embodiments may send records of the logged user interactions to the offer distribution system, as indicated by block 128, and the offer distribution system may store the records of the user interaction to seek compensation from merchants, as indicated by block 130. In some cases, the offer distribution system may aggregate such records across a relatively large number of users over time, and statistics indicative of the performance of offers may be calculated for presentation to merchants, for example, in a dashboard of a web interface hosted by the offer distribution system viewable in a merchant's account with the system.

Figure 7:
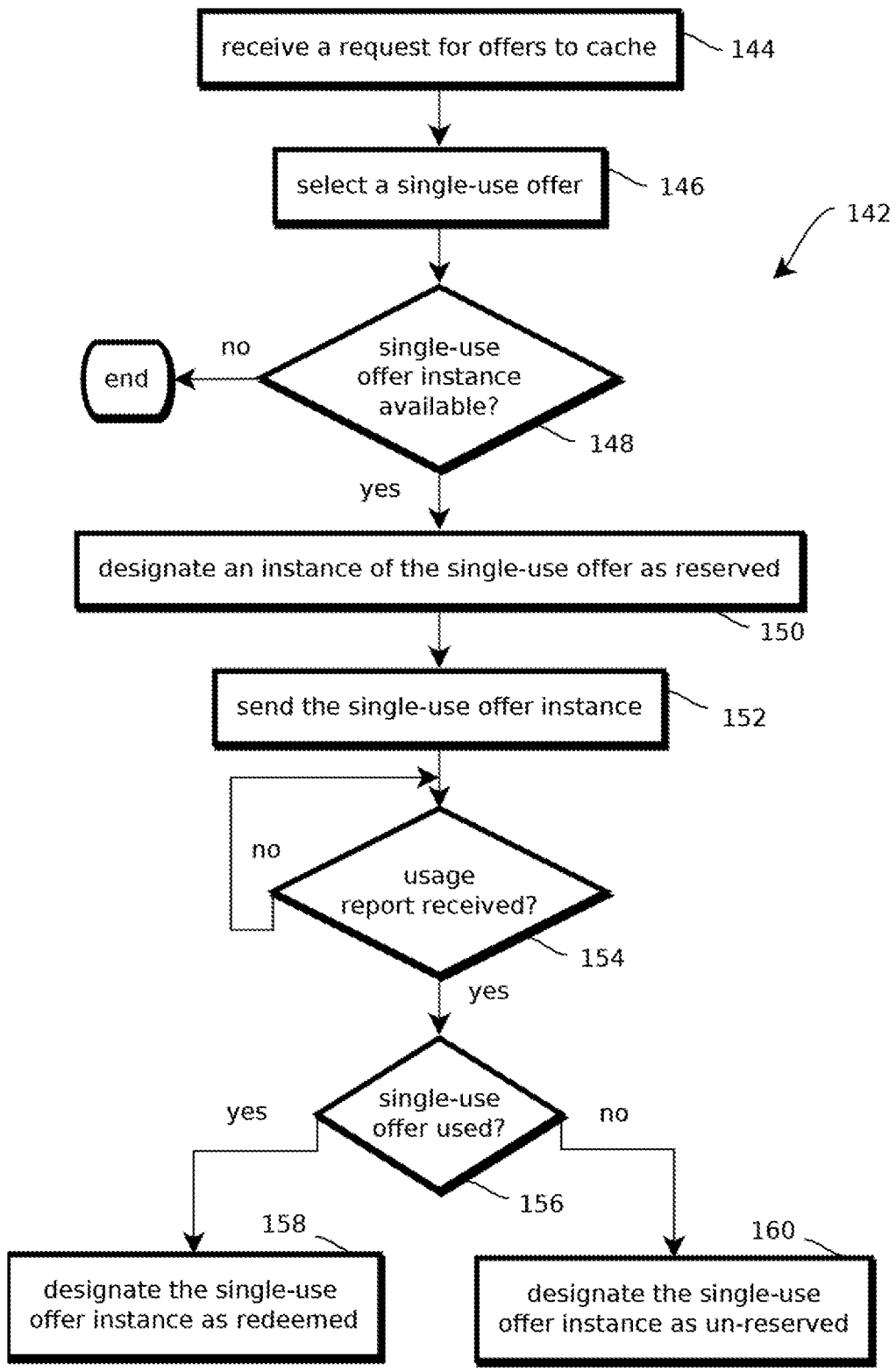
FIG. 7 shows an example of a process performed by some embodiments of an offer distribution system to cache single-use offers on mobile computing devices.

FIG. 7 shows an embodiment of a process 142 performed by an offer distribution system, e.g., like those described above, for caching and tracking single-use offers. As noted above, single-use offers are often distributed with a finite number of instances, each instance being tracked with a unique identifier of the offer instance. This attribute can present challenges in the context of caching offers, as cached offer instances may remain in an indeterminate state from the perspective of the offer distribution system after being sent to a client device for caching and while the client device is an area without wireless connectivity. This indeterminate state problem may be mitigated by some embodiments of the process shown by FIG. 7.

In some cases, the process 142 begins with receiving a request for offers to cache, as indicated by block 144. In some cases, this request is the request transmitted in step 110 of FIG. 6. Next, some embodiments may select a single-use offer, as indicated by block 146. In some cases, a plurality of single-use offers may be selected, and in some cases both single use and multi-use offers may be selected. In some cases, the processes described above with reference to step 134 of FIG. 6 may be executed to select the offers.

Next, some embodiments may determine whether any single-use offer instances are available, as indicated by block 148. In some embodiments, a merchant may specify that only a finite number of single-use offer codes are allocated to a given publisher, and that publisher may determine whether any of those instances remain, e.g., by querying a repository of offer instances or offer instances designated as unredeemed and unreserved. Upon determining that no single-use offer instances are available, the process 142 may terminate, at least as to that single-use offer.

Upon determining that an offer instance is available, some embodiments may designate an un-reserved, unredeemed instance of the single-use offer as reserved in memory, as indicated by block 150. This designation may be performed in some embodiments by updating an offer instance record in the offer repository described above with reference to FIG. 1 to include a value indicating that the instance is reserved. In some cases, the reservation designation includes a timestamp and a designation of when the reservation expires, such that reserved offers can be unreserved in the event that the client device never regains wireless connectivity.

Next, some embodiments may send the single-use offer instance to the client device to be stored in cache memory, as indicated by block 152. In some cases, the sent offer instance includes a time at which the offer instance expires and a time at which the reservation of the offer instance expires. Some embodiments of the client device application may determine whether an offer instance is expired in either sense as a precondition to presenting the offer instance to the user. Consequently, some embodiments may unreserved offer instances automatically on both the client and the server side, even in the absence of communication between the client and server, provided that timekeeping is roughly aligned between the two systems. In some cases, the reservation expiration time on the client device may be sooner than the reservation expiration time on the offer distribution system to allow for some misalignment, for example, several hours or one day sooner. The sent offer instance may include a unique identifier of the offer instance that may be presented to the user and entered into a merchant point-of-sale terminal, in which case some embodiments of the point-of-sale terminal may report back to the offer distribution system that the offer instance was redeemed.

Next, some embodiments may determine whether a usage report has been received indicating that the offer instance was redeemed or not redeemed, as indicated by block 154. In some cases, the usage report may be received after a client device performs the steps described above with reference to blocks 124, 126, and 128 of FIG. 6. In other cases, the usage report may be received from a point-of-sale terminal upon a unique identifier of the offer instance being submitted and the offer instance being validated by the offer distribution system as a condition of redemption.

Upon receiving a usage report, some embodiments may parse the report for an identifier of the single-use offer instance and determine whether the single-use offer instance is associated with a value indicating usage. Upon determining that the single-use offer instance was used, some embodiments may designate the single-use offer instance as redeemed in memory of the offer distribution system, as indicated by block 158. Upon determining that the single-use offer instance was not used, some embodiments may designate the single-use offer instance as unreserved, as indicated by block 160.

Thus, some embodiments may facilitate offer redemption, including redemption and presentation of single-use offers, even in areas with poor wireless connectivity. It is expected that providing offers even in these relatively challenging conditions will cause users to use the above-described offer applications more often, even in scenarios where wireless connectivity is robust, as users generally value reliability and tend to favor services and applications that work regardless of transient technical challenges. Accordingly, the processes above should be considered as including steps by which offers are distributed via a wireless connection in some, and in many cases most instances, with challenging cases being handled with the techniques described above.

As noted above, delivering relevant offers (or other content, such as advertisements, reviews of local businesses, and the like) to consumers while those consumers are in retail stores (or other businesses, such as restaurants, medical service providers, mechanics, and the like) can be challenging for a variety of reasons other than impaired wireless connectivity to the Internet. Often it can be difficult to determine the location of the consumer within a retail store (or other area with limited wireless access) with sufficient specificity to target relevant offers to the consumer. Installing in-store beacons to signal location with sufficient specificity can be expensive, particularly when fine-grained geolocation is desired, and GPS signals often do not work in stores even when connectivity is otherwise present. This can make it difficult to target offers to consumers with relatively fine granularity based on the consumer's current location, with the problem being exacerbated when wireless connectivity to the Internet is impaired.

Figure 8:
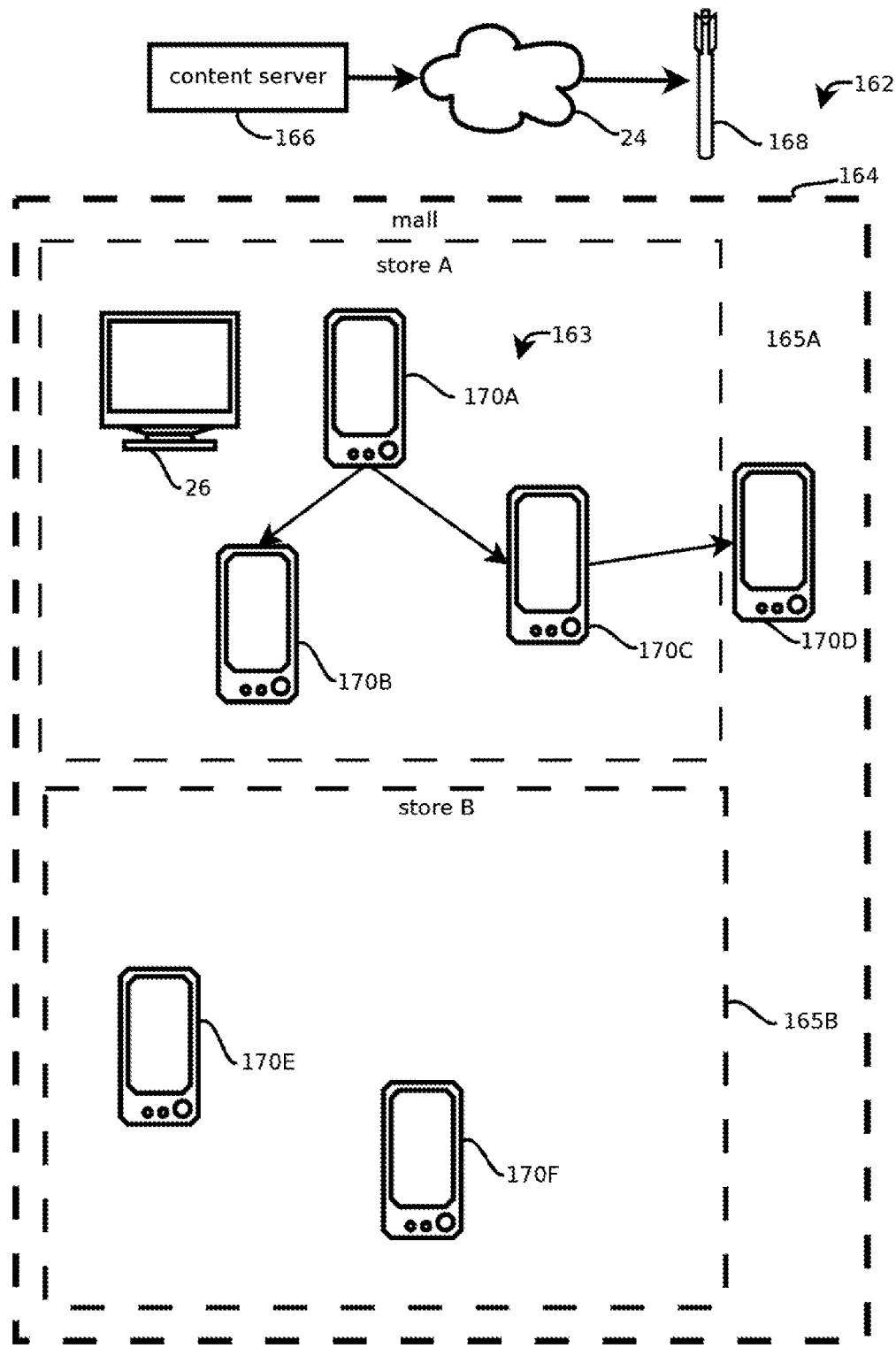
FIG. 8 shows an example of an ad-hoc mesh network geotargeting content items with peer-to-peer transmissions between mobile computing devices.
Figure 9:
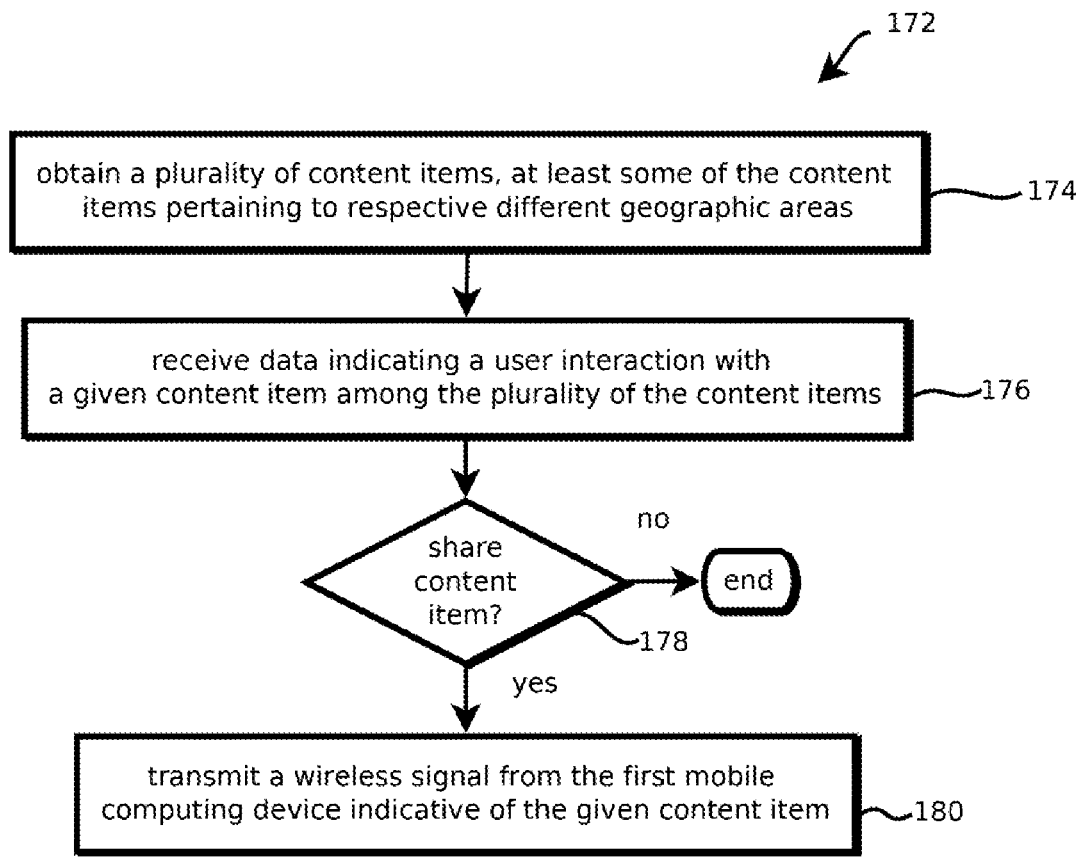
FIG. 9 shows an example of a process to share content with nearby mobile computing devices.
Figure 10:
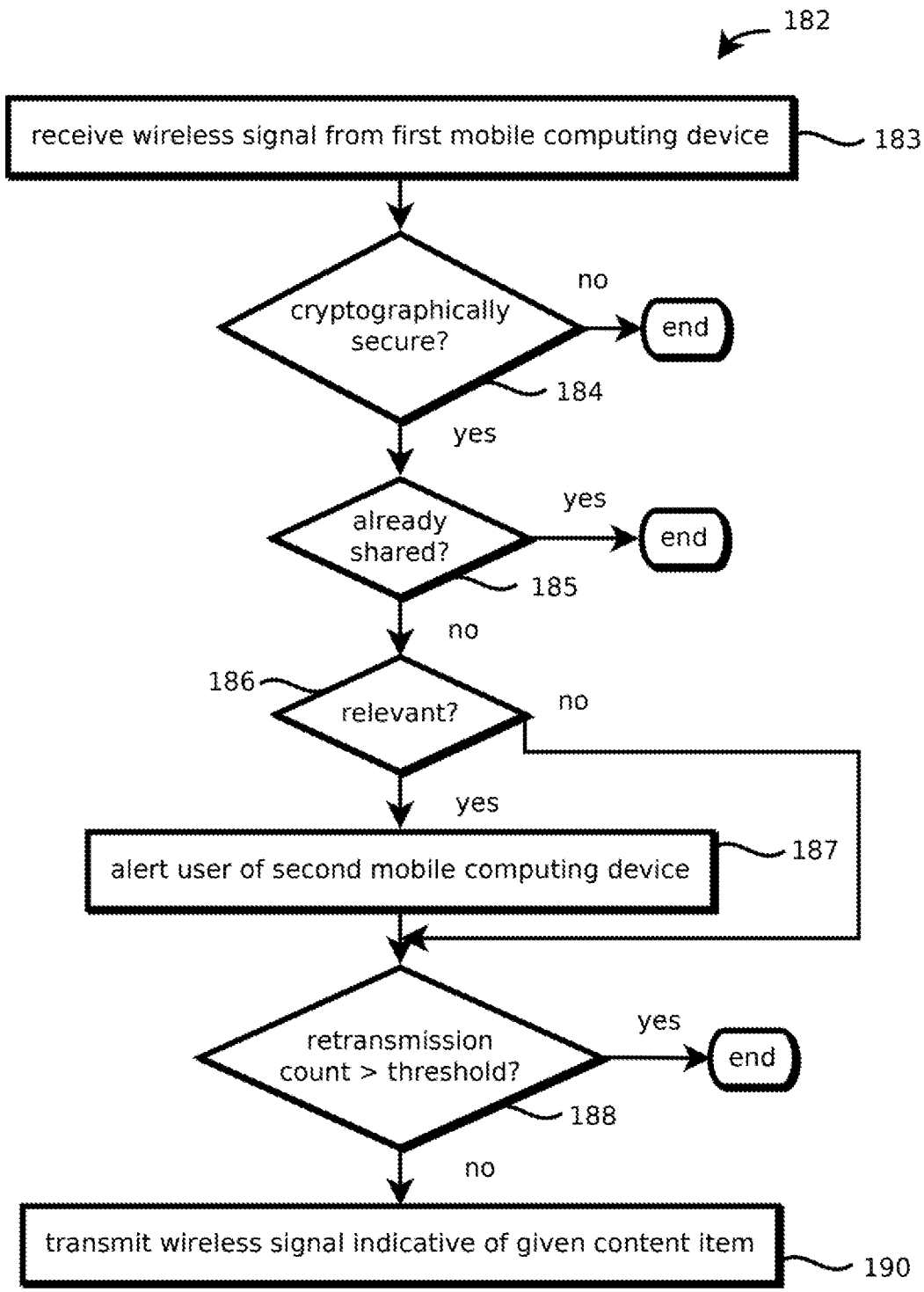
FIG. 10 shows an example of a process to receive, display, and retransmit shared content.

Some embodiments may mitigate some of the above-noted challenges and solve other problems described below with various techniques for using peer-to-peer signaling between consumer mobile devices, such as cell phones, wearable computing devices, and the like. An example of an ad-hoc mesh a network with such signaling is shown in FIG. 8, and an example of a process to generate and process such signals is shown in FIGS. 9-10. In some cases, before such signals are sent, an application executing on mobile computing devices (e.g., client devices, like the above-noted consumer mobile devices, such as hand-held mobile computing devices carried by consumers) may cache offers related to the consumer's current location and surrounding area. Examples of techniques by which such offers may be cached and presented to consumers are described above. In some cases, offers in cache memory may be shared with other consumer mobile devices in broadcast range of a given consumer via wireless peer-to-peer or signaling. Or in some cases where wireless Internet access is present, peer-to-peer wireless signaling of what offers (or types of offers) are being redeemed nearby may cause surrounding mobile computing devices to wireless request those, or related (e.g., of the same type), offers from a remote offer distribution system.

The peer-to-peer signaling may take various forms. In some cases, the signaling may include (e.g., be, or be initiated by) a wireless Bluetooth™ transmission, such as a Low-Energy Bluetooth beacon transmission, by an originating mobile computing device. Other mobile computing devices may execute a background process that monitors for such transmissions. Upon receiving one of these transmissions by devices within wireless transmission range, for example, within approximately 50 meters of the originating device, the surrounding mobile computing devices may present an alert. To this end, in some embodiments, the alerting mobile computing devices may request offers from the originating mobile computing device. Or in some cases, the alerting mobile computing devices may request offers from a remote offer distribution system, such as those described above, e.g., when Internet connectivity is present but GPS signals are unavailable. In cases in which wireless connectivity is poor, cached offers may be exchanged between the originating mobile computing device and those mobile computing devices in wireless range, or the devices in range may retrieve corresponding offers from their cache memory. In some cases, resources for the cached offers may be exchanged via a different wireless protocol, such as Wi-Fi Direct™, or via the Bluetooth™ wireless protocol, from the protocol by which relevance is signaled. Further, as explained below, in some embodiments, the offers may be cryptographically signed, for instance, with message authentication codes (MACs), like cryptographic hash functions based on (e.g., with input values of) a secret key (also held by the user device) and a sequence of bits encoding the offer, e.g., to output a 256 bit value that serves as a message digest. User devices may perform the same hash function calculation with the same secret key to determine whether the received MAC is consistent with (e.g., matches) the MAC calculated on the content received and packaged with the offer in retransmissions. Other embodiments may use digital signatures to similar effect.

Various actions may trigger the sharing of offers. For instance, a consumer may affirmatively elect to share an offer on a user interface of the originating mobile computing device. Or in some cases, consumers may be presented with a configuration option by which offers are automatically shared with those nearby in response to a user redeeming an offer. For instance, an offer code may be presented in a user interface of the offers application in response to a consumer selecting a "redeem now" button. In response to the user selecting such an input, some embodiments may then automatically share the corresponding offer with those nearby by transmitting a beacon indicating that an offer is relevant to the location. Thus, the mobile computing devices carried by consumers may fill the role of beacons in some applications.

In some cases, a mobile computing device 170 of a consumer or merchant employee may serve as the point-of-sale terminal. Some devices 170 may include a merchant application that wirelessly communicates with a merchant accounting and inventory management system, and consumers or merchant employees may scan (e.g., optically with a camera or with an NFC reader) a product identifier on the item to be purchased, enter payment information, enter or select a coupon or other offer, and execute the purchase by transmitting this information wirelessly to the merchant's accounting and inventory management systems. Such purchases may also serve as interactions, regardless of whether an offer was redeemed, for purposes of associating content items with the places surrounding where the interaction occurred.

In some cases, an in-store kiosk computing device may server the role of one or more of the mobile computing devices 170. For instance, the interaction that initiates sharing may include a consumer electing to load an in-store coupon to their cell phone from an in-store kiosk via NFC transmission. In another example, such a kiosk may server as a retransmitting consumer mobile device. In some cases, versions of the offers application executing on kiosks may have a relative long time threshold for retransmitting shared content items, as many kiosks are often secured to a fixed place in a store.

In some cases, sharing may include broadcasting a wireless beacon associated with the offer that was redeemed by the originating mobile computing device. In some cases, the beacon may include information that identifies the offer that was redeemed. Or the beacon may include an identifier of the category of goods or merchant for which the offer was redeemed, and corresponding offers in those categories, or for those merchants, may be acquired in response.

In some cases, to account for other users passing into and out of the area of relevance, which in some cases serves as a notification geolocation, such beacons may be transmitted for some duration of time after sharing begins, as the initiating user is likely to remain near the point of redemption for the offer for some amount of time, such as for 30 seconds to 2 minutes, while the user gathers their belongings at checkout and begins walking away.

In some cases, the beacon may be broadcast periodically until the mobile computing device determines that the user has moved more than a threshold amount of distance away from a point-of-sale terminal or has moved away from a point-of-sale terminal with more than a threshold amount of confidence. For instance, some embodiments may poll an accelerometer and gyroscope of the mobile device and integrate signals indicating movement to estimate the amount of distance that the consumer has walked away from the point-of-sale terminal without using cellular or global positioning signals that may be attenuated inside stores. Other embodiments may combine such signals, for example, in cases in which wireless connectivity is not impaired. In some cases, the magnetic environment of the retail store may be monitored and used to determine movement. Thus, some embodiments may continue broadcasting location relevant offers for some amount of time after the user or offers application elects to share the offer.

The sharing, or portions thereof, such as notification of a request to share, may be over various network topologies. In some cases, the sharing may be over an ad-hoc wireless mesh network (which may include systems that do not retransmit shared offers beyond the initial recipient and systems that retransmit over multiple hops) established by the mobile devices without the connections being mediated by a remote offer distribution system or other third party device. In some cases, the entirety of the sharing process may be executed between two consumer mobile devices, without another computing device coordinating the exchange. Or, in some embodiments, the offer distribution system may coordinate part of the exchange, e.g., supplying offer content after one mobile device signals to another that a particular offer is relevant.

In some embodiments, offer content being shared may be cryptographically signed for security purposes, e.g., to prevent insertion of malicious content by intermediate peer devices. For instance, in some cases, cryptographically signed content may be stored in cache memory, and retained in cache memory as a separate copy after a consumer views and redeems that content. Upon sharing, the cryptographically signed copy may be shared between mobile computing devices, and receiving devices may evaluate whether the cryptographically signed content has been manipulated. In some cases, a cryptographic hash value may be calculated on the offer content and associated with the cached content, and a receiving device may re-calculate that hash value on the received content to determine whether the associated value matches the calculated value, with a mis-match indicating that the content is potentially insecure.

In some cases, to increase the range of sharing, the sharing may be over multiple hops. For example, consumer mobile devices may receive a shared offer and then rebroadcast that shared offer, incrementing a counter associated with (e.g., broadcast with) the beacon. Other consumer mobile devices receiving the shared offer may determine whether the count exceeds a threshold before re-sharing the offer to prevent infinite loops or propagation outside the area in which the offer is potentially relevant. In another example, the offer may be shared with a geofence identifier (e.g., specified in the offer content or retrieved from memory of originating device), and the offer may be distributed over an indeterminate number of hops to each device that is within the same geofence.

In some cases, either the originating mobile computing device or a receiving mobile computing device of the shared offer may query cache memory of the respective mobile device for related offers. For instance, a beacon indicating that a nearby consumer redeemed an offer related to makeup may cause nearby mobile devices to extract from cache memory, or request from an offer distribution system, other offers related to cosmetics and present those other offers to the nearby consumers. In some cases, the mobile device or remote system may select such offers based on a user's profile. To preserve battery life and bandwidth, some embodiments may embed category and store descriptors in the beacon, and receiving devices may determine whether those descriptors are consistent with the receiving user's profile, e.g., to avoid the battery and bandwidth cost of requesting offers relating to dresses for a user that has never expressed an interest in women's fashion.

In some cases, mobile computing devices may update one another's cache memory based on peer-to-peer signaling. For instance, some mobile computing devices may periodically broadcast a beacon indicating a time at which that mobile device's cache memory was updated for the current cache geolocation. Surrounding mobile computing devices may receive the signal and determine whether their cache memory stores a more up-to-date selection of offers related to the current geolocation. In response to determining that one device has a more up-to-date collection of offers, that mobile device may transmit those offers to the other mobile device to update their cache memory. Some embodiments may perform more fine-grained updating, e.g., on an offer-record by offer-record or offer-instance by offer-instance basis. In some cases, a database of offers may, in essence, live on a mesh network inside of a store with poor wireless connectivity, with updates to the database being conveyed by consumer's carrying in mobile devices with database updates in cache memory, and information to synchronize with the remote offer distribution system being carried out of the stores in log files in cache memory of the mobile devices. In some cases, such synchronization information may indicate that a different consumer has redeemed a single-use offer instance, or that an offer has expired.

FIG. 8 shows a wireless environment 162 including a shopping mall 164 in which an ad hoc mesh network 163 is formed for sharing location-relevant offers or other content. In this example, the mall 164 may impair or block wireless signals, such as wireless signals providing Internet connectivity, wireless signals by which geolocation is determined (e.g., more fine grained geolocations that are available based on cell tower identifiers in range), or both. In some cases, the mall 164 may block such signals from transmitters external to the mall 164 while permitting transmissions within the mall 164. The illustrated mall 164 includes two stores 165A and B, by way of example. In typical use cases, mall 164 may include substantially more stores, or the present techniques are also applicable in a single-retailer facility, such as a big-box retailer, or in outdoor areas with limited wireless connectivity.

In some use cases, a content server 166 remote and external to the mall 164 may serve content via the Internet 24 and a cell tower 168. In some cases, the content server 166 may be the offer distribution system 12 described above, or in some cases, the content server 166 may serve other types of content, such as advertisements, reviews, business listings, and the like. In some cases, the served content may include a plurality of content items, such as a plurality of offers, and each content item may be served with an associated geolocation to which the content item pertains, such as an identifier of a retailer, a latitude and longitude, or other location identifying information indicating which geographic area relates to the respective content item. In some cases, the mall 164 may block or impair signals from the cellular tower 168, and mobile devices 170 within the mall 164 may obtain content items using the caching techniques described above. In some cases, wireless signals by which geolocation is determined, for example, signals from the cellular tower 168, signals from satellite navigation systems, or the like, may be blocked by the mall 164, and mobile devices 170 may be unable to ascertain their current geolocation in the absence of such signals, or in some cases, may be unable to ascertain their geolocation with greater than a threshold granularity, such as within 500 meters of their actual geolocation. Or GPS signals may be available, but batter usage constraints may prevent devices from performing higher-granularity location sensing. In this environment, mobile devices 170 may execute a process described below with reference to FIGS. 9 and 10 to indicate to one another which geographic locations within the mall 164 pertain to which content items through ad hoc mesh networks.

In this example, six mobile computing devices 170A-F are illustrated. The mobile computing devices may each be an instance of the consumer mobile device 14 described above with reference to FIG. 1 and may each include the peer-to-peer communication module 55 described above. In commercial implementations, the number of mobile computing devices 170 is expected to be substantially higher, e.g., several dozen or several hundred in a given store. The illustrated mobile computing devices 170 may each be carried by a respective user, and the users may be distributed throughout the mall 164. In some cases, some users may carry both a cellular phone and a wearable device, such as a smart watch, ear piece, or head-mounted display, in which case the functionality of the mobile computing devices may be divided between these computing devices, for instance, with alerts being presented on the wearable device and peer-to-peer communication being implemented by the cell phone.

In the example of FIG. 8, a user of mobile device 170A may initiate creation of mobile mesh network 163. In some cases, the user of device 170A may interact with a given content item, such as a given advertisement, restaurant review, business listing, or offer, and evidence of that interaction may be broadcast to other nearby mobile computing devices 170B and 170C as an indication that the content item with which the user interacted with on device 170A is potentially relevant to the current geographic location of devices 170B and 170C. In some cases, the broadcast range may be relatively small, such as less than 100 meters, less than 50 meters, or less than 10 meters to increase the likelihood that the broadcast content item is relevant to the receiving devices' current geolocation, or the broadcast range may be larger, such as less than 500 meters to increase the number of mobile computing devices that are alerted.

The illustrated mesh network 163 may be an ad hoc mesh network in which the mobile devices 170 exchange information without connections or exchanges being mediated by a central authority, for example, operator of the cellular tower 168, or by a pre-existing wired, network, such as the Internet 24. Ad hoc networking expected to facilitate network formation when the arrangement and number of mobile computing devices is not known in advance. In some cases, to increase the range of sharing, sharing may be performed over multiple hops, for example, from mobile device 170A to mobile device 170C to mobile device 170D. In some embodiments, to reduce overhead, sharing may be performed via a beacon broadcast without regard to whether other mobile computing devices are in range, for instance, without executing a handshake protocol before both devices communicate with one another and without transmitting acknowledgment signals. Such embodiments, in some cases, may share content items with multiple receiving devices in a single wireless transmission. In other cases, mobile devices may establish two-way communication channels to effectuate sharing. In some embodiments, sharing may be effectuated via wireless transmissions on a different transceiver from that with which the mobile devices 170 communicate with the cellular network 168 to avoid interfering with cellular networks. In some cases, wireless signals may share content items via Bluetooth™ transceivers, such as via a Low-Energy Bluetooth transmission or via Wi-Fi™ transceivers, such as via Wi-Fi Direct transmissions.

In some cases, the number of retransmissions may be limited to prevent sharing content items beyond the geographic area in which the content items are likely to be relevant. In the illustrated example, the sharing is limited to a single retransmission, in this case, resulting in an exchange between devices 170C and 170D. Mobile device 170B may also broadcast a sharing wireless signal, but that signal may not reach other mobile devices 170 that have not already received a given instance of the shared information.

To manage retransmissions, and avoid forming infinite loops, some embodiments may encode information about the transmission in the wireless sharing signal and track such information in memory. For instance, an originating mobile device may calculate a unique sharing instance identifier, e.g., by calculating a hash value on the device's UDID or MAC address and a time-stamp of when sharing occurs. This unique identifier may be encoded in the sharing transmission and each retransmission. Each device that transmits the sharing instance identifier may store the identifier in a log of previous transmissions in memory. Upon receiving a wireless sharing transmission from another device, each device may extract the sharing instance identifier from the transmission and determine whether the identifier is already logged in memory, indicating that the transmission should be disregarded as having data that the respective device already processed and transmitted. Some embodiments may decrement a counter on each transmission and determine to not rebroadcast an offer in response to determining that the counter satisfies a threshold.

Users may interact with content items in a variety of different ways to indicate the geographic relevance of the content item. Some examples relating to in-store offers are described below with reference to FIGS. 11 and 12. In some cases, the interaction may be selecting the content item, for example, a user selecting (e.g., touching on a touchscreen display) a given content item in a displayed listing of content items to view additional information about that given content item. In other examples, the interaction that begins the sharing process may be a user affirmatively electing to share the content item, for example, by touching a "share item" on-screen button presented with the given content item. In some cases, user profiles may include configuration settings by which automatic sharing is enabled or disabled according to an individual user's preferences, and corresponding records in memory may be queried when users interact with content items to determine whether to share in response to the perceived interaction.

Sharing content items may include a variety of different communications. In some cases, a unique identifier (e.g., unique within a name space of the content server 166) of the content item may be broadcast and receiving mobile user devices may retrieve the corresponding content item from their own cache memory or from content server 166 by searching for records associated with the identifier in response to receiving the unique identifier. In another example, resources by which the content item is presented may also be shared, for example, images, audio, textual descriptions, markup code, and the like, may be transmitted with the wireless signal by which content items are shared. In some cases, such resources may be retrieved in a peer-to-peer exchange after a unique identifier for a content item is broadcast and a receiving mobile computing device transmits a request for the resources, for instance, in response to the user of that device indicating a desire to view the content item. In some cases, sharing a content item may include sharing data indicative of the content item, for example, broadcasting an identifier of a business to which the content item pertains (e.g., where an offer is redeemable) with or without broadcasting a unique identifier of the content item itself. In response to receiving the identifier of the business, other mobile computing devices may retrieve from memory or request from content server 166 content items related to the identified business. In another example, a category of the content item, for example, sporting-goods, cooking supplies, women's shoes, or the like, may be transmitted, and receiving mobile user devices may retrieve from memory or request from content server 166 content items corresponding to the category for presentation to users.

In some use cases, a user of mobile computing device 170 may interact with a content item pertaining to an electronic coupon, such as an in-store coupon, by requesting the mobile device to display a barcode or exchange a coupon code via near field communication for input to a point-of-sale terminal 26, for example, at a checkout counter in a retail store. Such an interaction may provide a relatively reliable signal that the offer is relevant in the surrounding geographic area, and the mobile device 170A may then, either automatically according to a user profile or in response to an affirmative user request to share, transmit a beacon signal identifying the offer, for example, in a major value field and a minor value field of a Low-Energy Bluetooth beacon. In some cases, beacon signals may afford relatively little space for conveying information, in which case, a sequence of beacons may convey a sharing signal. For instance, the first two digits of a major value field may indicate a position in the sequence, and the remaining values may each include one-fourth of the content in the sharing signal. A receiving device may receive four sequential beacons, arranging the content according to the first two digits of the major value field, and append the content in sequence to re-construct the shared signal. In another example, a user device may advertise its availability as a Bluetooth Low Energy (BTLE) server, and clients (e.g., other user devices), upon receive a beacon advertising this capability, may connect to the user device and pull data stored on the device. This technique may be used in use cases where higher bandwidth for conveying offers is desired. User devices 170B and 170C in wireless range may receive this beacon, parse the identifier from the beacon, retrieve corresponding content, and present an alert, for example, with haptic feedback, audio, and an on-screen display, for instance, via a wearable computing device or via a cell phone, that alerts their respective users to the offer redeemed by the user of mobile device 170A or other offers pertaining to the same store or the same category of goods. In some cases, receiving computing devices 170B, C and D may emit an audible alert to signal to their respective users, and in some cases the user of device 170A that the offer has been successfully shared.

In some cases, nearby mobile computing devices may not receive the first broadcast of the wireless signal, for example, because the mobile computing device was just out of range or the signal was intermittently blocked. To increase the likelihood that relevant offers or other content reach mobile computing devices in the relevant geographic area, in some embodiments, the wireless signal by which content is shared may be repeated, for instance, periodically, for a duration of time, or until some other threshold condition is achieved. For instance, mobile computing devices 170A, B, and C may periodically repeat a beacon signal including the identifier of the content item initially identified by device 170A until a threshold number of repeated transmissions have occurred, a threshold amount of time has elapsed since the initial transmission, or since the content item was received in a sharing signal. In some cases, the duration of time may be selected based on a desired granularity with which geographic areas are targeted, with longer durations selected in favor of less granular but more comprehensive sharing, and shorter duration selected to achieve more granular, but less comprehensive sharing of content. In some cases, mobile computing devices 170 may estimate a distance the user has traveled since sharing began. For example, mobile computing devices 170 may repeatedly, for instance periodically, request acceleration measurements from an accelerometer of the respective mobile computing device 170, and the responsive measurements may be integrated over time to calculate velocities, which may be integrated again over time to calculate distances that the mobile computing device has likely traveled. In some cases, the estimated distance may be compared against the threshold (e.g., 10 meters), and in response to determining that the distance exceeds the threshold, repeating of the sharing signal may be terminated.

In some cases, the longer repeated transmission has occurred, or the further the user has traveled, the transmission strength of the sharing signal may be reduced. For instance, initially the sharing signal may be broadcast at 100% power and, then every five seconds, the transmission strength may be reduced by 10 percentage points, or initially the sharing signal may be broadcast at 100% and, then every 5 meters of distance traveled, the transmission strength may be reduced by 10 percentage points. In some cases, transmission strength may be modulated based on a number of times that a sharing signal has been retransmitted (e.g., hopped between devices), for instance, the signal broadcast by device 170A may be at 100% power, while the signal broadcast by device 170C may be at 50% power. In the illustrated example, a single retransmission, or second hop, is shown, but some embodiments may perform additional retransmissions, for instance, three retransmissions, four transmissions, or more, trading off between comprehensiveness of sharing and resolution of geo-targeting.

In some cases, the threshold duration of time, threshold distance, number of retransmissions, or rate of decrease of transmission strength may be adjusted based on a profile of a business to which the content item pertains, for example, as stored in memory of the mobile computing devices' client offer applications or in association with a given content item. Larger stores may be associated with longer thresholds, as it is expected that it will take longer for a consumer to walk out of the store if the store is larger.

In some cases, to encourage sharing, some embodiments may log instances in which a user elects to share a content item, and the logged instances may be reported back to content server 166 upon determining that wireless connectivity to the Internet 24 has returned, or at the time of sharing in the event that such connectivity is present. In some embodiments, the content server 166 may compare a count or rate of such sharing instances to various thresholds and update user profiles with virtual rewards, such as badges, indicating relative levels of status in a community of users relating to the content. In some cases, mobile devices receiving shared content items may present, with the corresponding alert, a graphical user interface by which the user may rate whether the shared content item is relevant to their current geographic location. In some cases, received feedback may be stored in these receiving mobile computing devices, for example, in a log file in memory, and reported back to content server 166 upon the return of wireless connectivity to the Internet 24, or at the time the feedback is provided if connectivity is present. In some cases, the feedback may be a binary value of relevant or not or a score, for example from 0 to 5.

In some cases, the content server 166 may aggregate reported feedback, for example, by calculating a measure of central tendency (like a mean, median, mode) of the reported relevance scores input by such users, both for the users providing feedback and for the users sharing the content items for which the feedback was provided. In some embodiments, user profiles may be updated with statistics on the relevance of shared content items to other users and statistics on the scoring of relevant items for other users. In some embodiments, mobile computing devices 170 may receive a signal from content server 166 disabling the sharing of content items in response to the content server 166 determining that a corresponding user has a pattern of sharing irrelevant content items, for instance, in response to a measure of central tendency satisfying a threshold, such as being lower than a threshold average relevance score. Similarly, in some cases, content server 166 may disregard or down-weight ratings from mobile computing devices 170 in response to average relevance scores from those devices, such as in response to the average of such scores being above or below a threshold indicating that the user is not carefully considering relevance.

As noted above, in some cases, in addition to sharing identifiers of content items, some embodiments may also exchange resources by which such content items are presented on mobile computing devices 170 through direct, peer-to-peer transmissions between the mobile devices 170. For example, a user of mobile computing device 170A may have in cache memory resources for displaying a given offer redeemed by that user, and a user of mobile device 170C may not have those resources in memory. In this example, in some embodiments, such resources may be transmitted by device 170A, for instance, in response to a request for those resources from device 170C upon a user electing to view the corresponding offer on device 170C.

Such exchanges may present security issues for the user of device 170C, as the content is coming from a potentially untrusted device 170A, and the user of device 170A may, for example, attempt to add malware to that content. To prevent such tampering, in some embodiments, the content server 166 may cryptographically sign collections of such resources, for example, in an encrypted file for each content item associated with a unique identifier for the respective content item. In some cases, the received cryptographically signed content may be stored in memory of the mobile device 170A and retransmitted in the cryptographically signed format to device 170C (which may include applying additional encryption), such that device 170C may determine whether the content has been manipulated after being sent from content server 166. In some cases, content server 166 may calculate a checksum, such as an MD5 checksum or SHA-256 value on resources corresponding to a content item and, before displaying that content item, retransmitted from device 170A, mobile computing device 170C may calculate the same checksum and compare the calculation result to the checksum provided by content server 166 to ascertain whether the content has changed.

In some cases, such checksums and associated identifiers of content items may be stored in the cache memory of mobile device 170C before entering the mall 164, for example, upon entering a cache geofence 16 (FIG. 1), and the mobile computing device 170C may rely upon instances of the corresponding resources stored in cache memory of other mobile computing devices 170 while inside the mall 164, verifying the safety and accuracy of such copies according to the (relatively small, memory and bandwidth in-intensive) checksums held in cash memory. This technique is expected to reduce bandwidth usage as cache memory may be shared among mobile computing devices 170, while the relatively small checksums held in memory in advance may indicate the reliability and safety of such content. For example, cache memory may be shared among mobile computing devices 170 in a peer-to-peer network through use of a distributed hash table (for routing, with global unique identifiers associated with collections of offers stored in the respective mobile device's cache memory) and lookup service, such as Kademlia distributed hash table routing systems. Thus, even in a mall operating as a relatively effective Faraday cage, a relatively large collection of offers may reside within the peer-to-peer network and be accessible to the mobile computing devices without any one mobile computing device being burdened with holding the entire collection in memory.

Providing geo-targeted content relatively reliably within the mall 164, even when geolocation signals are unavailable, and in some cases even when Internet access is unavailable, is expected to increase the perceived reliability of the entity operating content server 166 for consumers. Such perceived reliability is expected to cause consumers to use corresponding services more generally, even in more typical use cases, such as in desktop computing scenarios or in other mobile computing scenarios, in which full wireless connectivity is present. Thus, some embodiments may operate in both regimes, providing content to desktops and mobile devices via the Internet when connectivity is not impaired.

The peer-to-peer sharing activities described above, in some embodiments, may be implemented with a client offer application, or other client content application, having a peer-to-peer communication module, like that of the peer-to-peer communication module 55 described above with reference to FIG. 1. In some cases, data may be exchanged directly, wirelessly between mobile computing devices, for instance, by one mobile computing device transmitting a wireless beacon, and another computing device receiving the wireless beacon with an antenna. Indirect communications may also be used in some embodiments, for instance, over multiple hops. In some cases, the peer-to-peer communication module 55 may operate under the control of controller 54 and interface with offer cache 50, for example, retrieving corresponding offer information, to perform the operations of FIGS. 9 and 10.

FIG. 9 shows an example of a process 172 to share a content item. In this example, the process may begin with obtaining a plurality of content items, at least some of the content items pertaining to respective different geographic areas, as indicated by block 174. In some cases, each content item may be associated with a unique identifier, an encrypted cryptographically signed file having resources by which the content item may be displayed or otherwise presented, and a respective geographic identifier, like a latitude and longitude, business name, or the like. In some cases, each content item may also be associated with a category, like a category of goods or services. In some cases, the plurality of content items may be obtained via the above-describe caching techniques, or in some embodiments, the content items may be obtained at the time a user requests the content items, for example, via a mobile web application or via a mobile native application that sends a request via the Internet 24 to content server 166 in response to user requests, such as a user search for a particular subset of content items. In some cases, the plurality of content items may be displayed to the user, for example as an on-screen list of search results. Displaying the content items may include displaying a subset of the information about each content item, such as a list of short descriptions of offers. In some cases, the content items may be displayed in a graphical user interface operative to receive user input, such as touches, that select individual ones of the content items.

Next, some embodiments include receiving data indicating a user interaction with a given content item among the plurality of content items, as indicated by block 176. In some cases, the received data may be a user selection of a single content item among a list of content items displayed in a graphical user interface. Or in some embodiments, the data may be a subsequent, more specific user interaction, for example, a user request to redeem a particular displayed offer or a user request to share a content item currently displayed in a graphical user interface of a mobile computing device. In some cases, the received data may be a graphical user interface input event created by a user touching (or releasing a touch of) a screen of the mobile computing device, or in some cases, the data may be sent from another computing device, such as a wearable computing device sending a Bluetooth™ communication to a paired cellular phone indicating that a user interacted with a content item presented by the wearable computing device.

Next, some embodiments may determine whether to share the content item, as indicated by block 178. In some embodiments, a graphical user interface presenting the content item may include an input by which a user elects to share the content item, in which case the process may proceed to the next step. In other cases, a client application may include user configuration setting by which sharing is automatically enabled or disabled (e.g., for certain types of content items specified by the user), and embodiments may retrieve configuration settings from memory to determine whether to share the content item. Upon determining not to share the content item, the process 172 may end. Upon determining to share the content item, the process 172 may proceed to the next step.

Some embodiments may include transmitting a wireless signal from the first mobile computing device indicative of the given content item, as indicated by block 180. As noted above, the wireless signal may be a beacon broadcast by the mobile computing device, such as a Low-Energy Bluetooth™ beacon or a Wi-Fi™ beacon. In some cases, as noted above, the transmission may be repeated, for example, periodically, such as several times a second (e.g., approximately every 100 milliseconds) to increase the likelihood that the transmission is received. Further, as noted above, the transmission broadcast strength may be modulated based on one or more inputs, such as an amount of time that transmission is repeated, an estimated distance traveled by the first mobile computing device, or a profile of a business to which the content relates.

In some cases, the wireless signal may encode information about the content item, such as a unique identifier of the content item, a category of business to which the content item pertains, a unique identifier of a business to which the content pertains, or the like. Such encoded information may be indicative of the given content item even if the information does not uniquely identify the given content item, for instance, broadcasting a store identifier without identifying the specific offer redeemed by a consumer. Or in some cases, the wireless signal may be indicative of the given content item by encoding a unique identifier of the given content item in a broadcast beacon.

In some cases, the wireless signal may encode metadata about the transmission. For instance, some wireless signals may encode a unique identifier of the sharing instance, which may be retransmitted in wireless signals re-broadcast by other, downstream mobile computing devices that retransmit the data indicative of the content item, so that upstream devices can determine whether they are receiving information that the respective device already transmitted. The wireless signal may also encode a broadcast strength, so that some embodiments may compare a perceived signal strength to broadcast strength to infer distance. In some embodiments, the wireless signal may encode a hop count, indicative of the number of times the information encoded has been retransmitted from one device to another in a given path through the network 163.

FIG. 10 shows an example of a process 182 executed by some embodiments of the communication module 55 (FIG. 1) to process wireless signals sharing content items from other mobile computing devices. In the example of FIG. 8 and FIG. 1, in some cases, each of the mobile computing devices 170 may execute a client offer application 42 configured to perform the steps of the processes 172 and 182 of FIGS. 9 and 10, respectively, depending upon the role performed by the mobile computing device 170 at a given time. Thus, mobile computing device 170A may perform the process 172 of FIG. 9, and mobile computing devices 170B, C, and D may perform the process 182 of FIG. 10. In some cases, each of these mobile computing devices 170 may contain hardware and/or software for performing the processes 172 and 182, e.g., with process 182 executing as a background process in an operating system of the mobile computing devices 170, subscribing to beacon events from a given wireless transceiver. In some cases, the corresponding client offer application may be provided by a remote server hosting code for mobile device applications and storing in memory such code, e.g., in an application store of hosted, OS-provider approved "apps."

As illustrated, in some embodiments, the process 182 may include receiving a wireless signal from a first mobile computing device, as indicated by block 183. In some cases, the received wireless signal may be a beacon transmitted by another mobile computing device. Receiving the wireless signal may include receiving the wireless signal with a different wireless transceiver from the transceiver used to communicate with cellular base station 168. For example, mobile computing devices 170 may each include a plurality of wireless transceivers, such as a Bluetooth transceiver, a Wi-Fi transceiver, and a cellular transceiver, each of which may include or be coupled to a medium access control module and an antenna in a respective network interface subsystem that interfaces with the operating system via a respective driver that moves data from a buffer memory in the subsystem to random access memory of in the address space of the operating system. In some embodiments, the different wireless transceivers may server different roles to account for differences in the respective networks. In some cases, the cellular transceiver may exchange wireless signals with the cellular station 168 to communicate with the Internet 24 and the other, different transceivers may exchange wireless signals with the other mobile communication devices 170.

In some cases, receiving the wireless signal may include decoding and parsing a payload encoded in a beacon and measuring a signal strength with which the wireless signal is received. In some embodiments, the payload may include an identifier of a content item or an identifier of a business to which the content item pertains. Some embodiments may determine to disregard the wireless signal in response to the signal strength of the wireless signal being less than a threshold. For example, some embodiments may compare a broadcast signal strength value encoded in the wireless signal to a measured received wireless signal strength and disregard the wireless signal in response to the difference between these two signal strengths satisfying a threshold, for instance, being greater than a threshold signal strength value indicating that the wireless signal was broadcast from a mobile computing device that is relatively far away.

In some cases, receiving a wireless signal includes receiving a single beacon transmission containing all of the information by which a mobile computing device shares a content item with another mobile computing device, though additional information may be obtained from cache memory of the receiving device or from the content server 166. Or in some cases, receiving a wireless signal includes multiple transmissions back and forth between two mobile computing devices, for example, executing a handshake protocol to establish a connection, encoding recipient device and transmitting device identifiers in transmitted signals (e.g., medium access control addresses), and transmitting acknowledgment signals indicating receipt of transmitted data.

In some embodiments, receiving a wireless signal may further include receiving resources by which content items are presented, such as images, markup code, and text. In some cases, for security purposes, such resources may be cryptographically signed by a content server, such that an intermediate mobile computing device that shares this information may not tamper with the resources, for example, by injecting malware. In some embodiments, the content server 166 may store a private key in memory and share a public key (e.g., RSA signature keys) with the mobile computing devices 170, which may store the content server's public key in memory. Before transmitting resources for a content item, the content server 166 may calculate a hash of the resources (e.g., SHA-256 or MD5) and encrypt the resources with the private key. The receiving device may decrypt the resources and authenticate the information with the public key. Or some embodiments may use private key cryptography. In some instances of such embodiments, the process 182 may include determining whether the received resources are cryptographically secure, as indicated by block 184. As noted above, this determination may include comparing a hash value calculated by a content server 166 by inputting the resources into a hashing function to a hash value calculated by the receiving mobile computing device by inputting the received resources into the same hashing function. Upon determining that the two values match, some embodiments may deem the resources acceptable and proceed to the next step. Upon determining that the two values do not match, some embodiments may stop the process 182.

Next, some embodiments may determine whether the received wireless signal is indicative of a given user interaction with a given content item that was already shared, i.e., the same sharing instance, as indicated by block 185. For example, in the ad hoc mesh network 163 of FIG. 8, after mobile computing device 170A transmits a wireless signal by which a given content item is shared with devices 170B and C, those devices may then retransmit an indication of the same given content item, thereby sharing the given content item with device 170D. The same retransmission may be received by the originating mobile computing device 170A. Similarly, mobile computing devices 170B and C, when retransmitting the shared given content item, may share the given content item with one another, thereby duplicating the transition from mobile computing device 170A, at least in part. To detect such duplicates, some embodiments may, upon receiving a wireless signal sharing the given content item or determining to share a content item initially, store in memory a unique identifier of the sharing instance, which may be encoded in the original wireless signal transmitted by the first mobile computing device 170A, for instance, a hash value calculated based on a timestamp of the interaction and unique device identifier of the originating mobile computing device 170A. Subsequently received wireless signals may be parsed for their sharing instance identifier, and those sharing instance identifiers may be compared with stored sharing identifiers in memory. Upon detecting a match, embodiments may determine that the received wireless signal relates to a sharing instance that was already retransmitted or already shared, causing the process 182 to stop. Similarly, when initiating a sharing instance, the sharing instance identifier may be added to the same record in memory (e.g., a log file or transaction record) for reference in the event that the sharing instance retransmitted by the receiving mobile computing devices is received by the originating mobile computing device. Upon determining that the received wireless signal relates to a sharing instance that was not already shared, embodiments may proceed to the next step.

Next, some embodiments may determine whether the received wireless signal is indicative of content items that are relevant to a user of the receiving mobile computing device, as indicated by block 186. Relevance may be determined with a variety of techniques. In some cases, content server 166 may store in memory of a client offer application 42 some or all of a user profile from user data repository 36. In some cases, the user profiles may include scores for various categories of businesses or categories of offers or categories of other content calculated by the content server 166, such as the offer distribution system 12, based on previous user interactions with content (e.g., click-throughs, redemptions, viewing time, etc.). For instance, embodiments may calculate a percentage of offers relating to a given business or category of business or category of goods or services viewed by a given user that the user later redeemed, and these percentages may be stored in memory in the corresponding user profile for download to the client offer application 42. Upon receiving shared data indicative of the given content item, the shared data may be used to select corresponding percentages (e.g., in the same category or for the same business as the shared content item) and calculate a relevance score, for instance, by multiplying a score for the business to which an offer pertains by a percentage score for the business for that user according to that user's past interactions with offers related to that business. The relevance score may be compared to a threshold to determine whether the user is likely to find the shared information relevant. For example, a male that has only redeemed offers relating to sporting goods is unlikely to find data indicative of a content item for a women's clothing store relevant, but offers relating to sporting goods may be relevant. Upon determining that the data indicative of the given content item is not relevant, embodiments may proceed to block 188, or upon determining that the data indicative of the given content item is likely to be relevant, embodiments may proceed to block 187.

In block 187, some embodiments may alert a user of the second mobile computing device, which received the wireless signal in step 183, of one or more content items selected based on the received wireless signal. In some cases, the received wireless signal identifies an individual content item with which the originating user interacted, and an alert may be presented that identifies that given content item. In another example, other, different content items may be selected based on the data indicative of the given content item. For instance, the wireless signal may identify a given retailer, and content relating to the given retailer may be retrieved from the receiving mobile devices cash memory or from a remote content server 166. In some cases, the content that is retrieved may be a collection of offers redeemable at the given retailer. In some embodiments, a user profile may be used to select among the responsive collection of offers, for example, to identify offers in a category in which the user has redeemed more than a threshold amount of offers in a threshold amount of time (e.g., more than 3 in the past six months). For example, the responsive offers may be scored according to a frequency of redemption in corresponding categories, and a highest scoring offer may be selected. The user may be alerted to the highest scoring offer with a variety of techniques. In some cases, a sound may be emitted by the second mobile computing device; haptic feedback, such as a vibration pattern, may be provided by the mobile computing device receiving the wireless signal; or a description of the selected offer may be displayed on a screen of the second mobile computing device. In some cases, alerting the user may include transmitting a command to a wearable computing device coupled to the second mobile computing device to present the alert.

Figure 11:
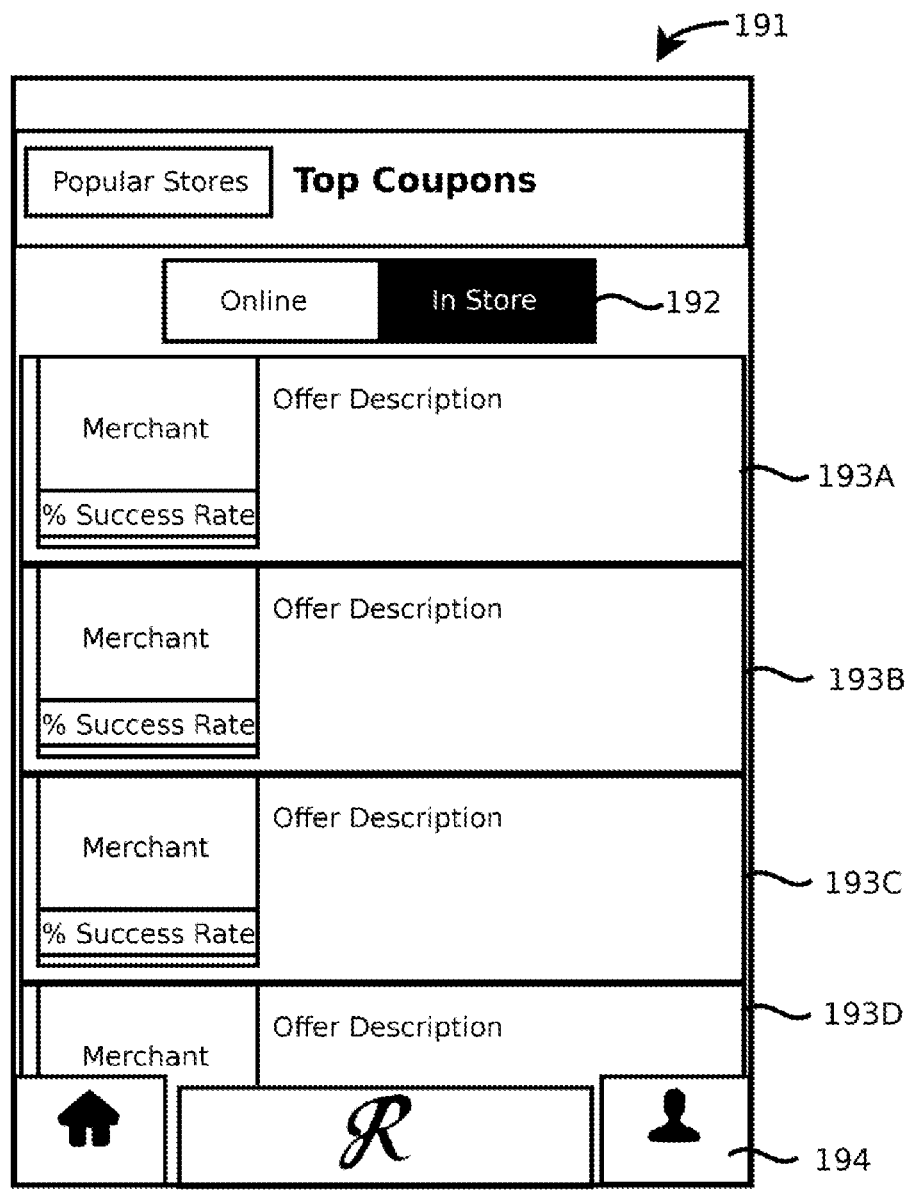
FIG. 11 shows an example user interface of a mobile computing device displaying a plurality of electronically distributed offers.

The alert may include a graphical user interface element that, when selected, causes a display of the selected content item to be presented, such as that of FIG. 12 described below. Or in some cases, a plurality of content items (e.g., a collection for a given store) may be presented, like as is shown in FIG. 11 and described below. In some cases, user interactions with shared offers may cause those offers to be re-shared with a wireless signal that 1) includes the earlier sharing instance to avoid duplicating for those users who remained nearby; 2) includes a new sharing instance identifier; and 3) includes a share-count value indicating that this is an interaction prompted by an earlier sharing instance. In some cases, the share-count value may be incremented each time a sharing instance prompts a user to interact with content, and the share-count values may be used to adjust retransmission thresholds, e.g., increasing the hop-count threshold, increasing the distance threshold, or increasing the repeating time threshold (i.e., an amount of time a given device repeatedly transmits a sharing signal), as such counts may be indicative of a highly relevant offer to an area.

Next, some embodiments may determine whether a retransmission count (i.e., a hop count) exceeds a threshold, as indicated by block 188. As noted above, some embodiments may retransmit shared content items across multiple mobile computing devices that retransmit some or all of the shared information. To avoid alerting users that are relatively far away from the originating mobile computing device to potentially irrelevant offers, some embodiments may limit the number of retransmissions. In some cases, the wireless signals may encode a retransmission count, and receiving wireless communication devices may increment this count before retransmitting the wireless signal. The process 182 may include parsing such a count from the received wireless signal and comparing it to a threshold count to determine whether the threshold count would be exceeded by a retransmission. Upon determining that the retransmission count is greater than the threshold, embodiments of the process 182 may stop. Upon determining that the retransmission count is not greater than the threshold or is equal to threshold, some embodiments of the process 22 may proceed to transmit a wireless signal indicative of the given content item, as indicated by block 190. In some cases, the retransmission may include some or all of the data in the received wireless signal, in some cases with an incremented retransmission count. In some embodiments other mobile computing devices executing the process 182 may receive this transmitted wireless signal and execute the process 182 again. In some embodiments, the transmitted wireless signal may be transmitted on a different wireless transceiver from the cellular wireless transceiver to avoid interfering with cellular communication networks, or some embodiments may also use the cellular wireless transceiver. In some embodiments, an originating device may transmit a "fingerprint" of its current wireless environment with a shared offer, and other devices may determine whether to re-transmit the offer based on whether the fingerprint of their respective wireless environment is similar and, thus, indicates proximity to the originating user device. For instance, a list of SSID values in range of a given user device and perceived signal strengths may serve as the fingerprint, and other devices may determine score similarity of fingerprints by determining a percentage of SSID values perceived by the originating device with more than a threshold signal strength that are also perceived by the downstream user device, e.g., with more than another threshold signal strength, which may be a different, lower threshold to facilitate further distribution of offers. Offers may be presented or retransmitted in response to determining that the similarity score satisfies respective thresholds, indicating differing likelihoods of proximity.

As noted above, the techniques described herein relate to and are applicable to a variety of different types of content. FIGS. 11 and 12 show example graphical user interfaces relating to embodiments in which the content items are offers. In the example of FIG. 11, the client offer application 42 may display a collection of offers in a graphical user interface 191, for instance, in a scrollable list of offers. The illustrated user interface 191 may include a faceted search interface 192 for searching between online or in-store redeemable offers and a list of offers 193A through D. In some embodiments, each offer 193A through D may each pertain to a different store, such as one of a plurality of different stores for which offers were cashed upon a user entering a cache geo-fence for a mall. Or in some cases, the offers 193A through D may pertain to the same store. In some use cases, the offers may be obtained at the time a user request to view the offers, for instance, by sending a request for offers via the Internet 24 in response to a user entering a query for offers. In some cases, the user interface 191 further includes a user profile input 194 by which a user requests to view and edit configuration settings and their user profile.

Figure 12:
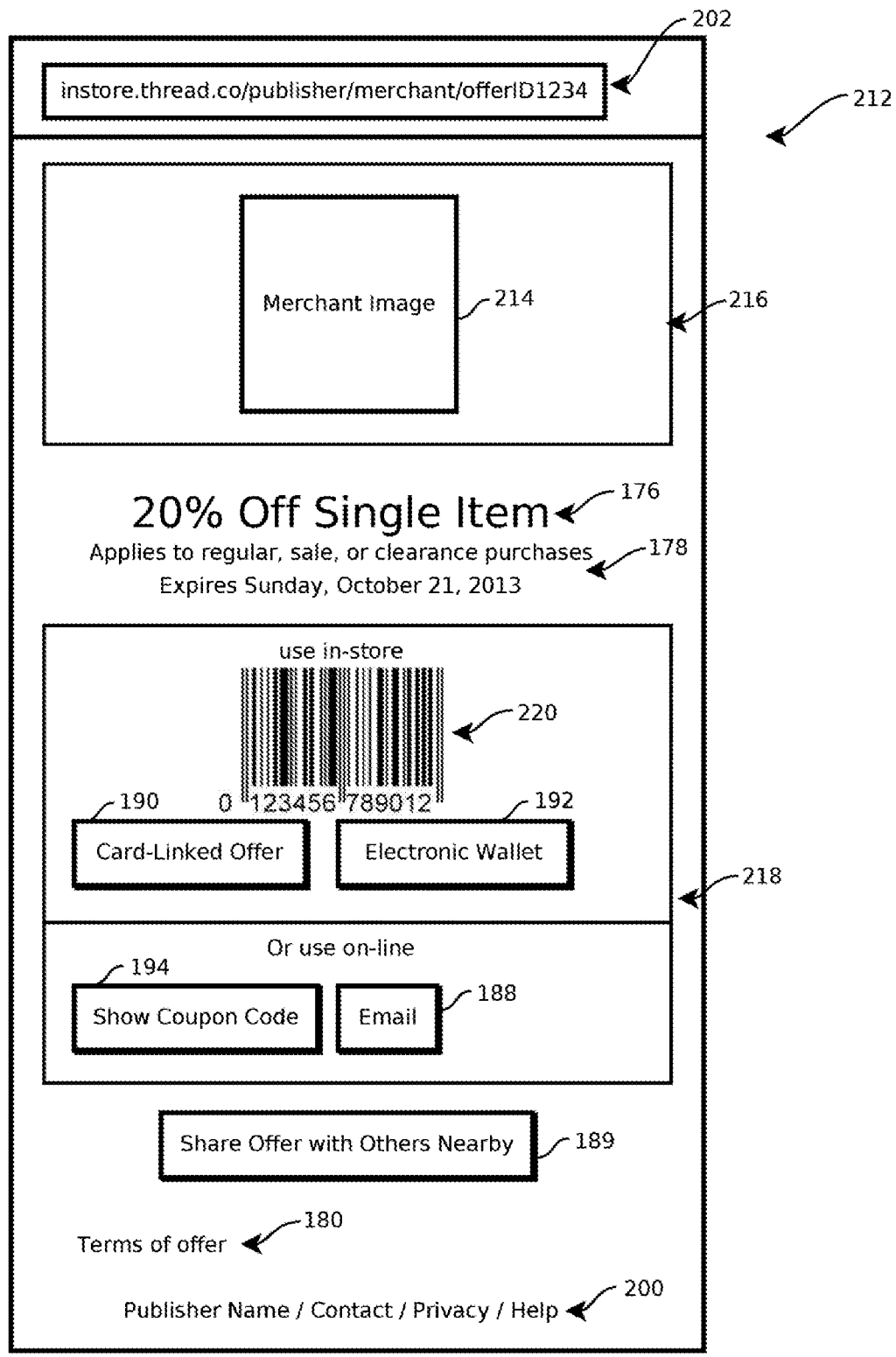
FIG. 12 shows a more detailed view of an example given offer in a user interface of a mobile computing device.

FIG. 12 shows an example graphical user interface displaying an offer content item 212. In some cases, the offer content item 212 is obtained with reference to a uniform resource identifier (URI) 202 that yields offer content with a responsive design, e.g., selecting different formats for different sized displays. This example of offer content includes a merchant image 214 associated with the offer or the merchant. The illustrated offer content 212 also includes a banner 216, which may be of a color selected by the merchant or the publisher, depending upon the implementation. The offer description 176 and summary of terms 178 is also used in the offer content 212, though some versions may store and display a shorter version of the description or terms for smaller displays. In this example, the offer content 212 includes a set of offer interfaces 218. In this case, the interfaces may include a card-linked offer button 190, an electronic wallet button 192 to facilitate in-store usage of the offer by sending the offer to an account with which the consumer can pay for a transaction and apply the offer. Interfaces also include buttons 192 and 188 showing the offer code or emailing the offer, respectively. Further, this example includes an optically scannable image 220, in this case, a barcode image, though other types of such images or other computer-readable exchanges may be used, including temporally changing patterns (e.g., codes transmitted by flashing a pattern on a display screen), QR codes, or NFC transmissions. As noted above, some embodiments may dynamically generate single-use offer codes, and the barcode image 220 may be dynamically generated, for example, at the time the offer content 212 is requested. The offer content 212 may also include the publisher links and information 200. Some or all of the content of FIG. 11 or 12 may be cached or geotargeted with the techniques described above.

Thus, some embodiments using the cached offers may deliver location-relevant offers to other users that are relatively close to a location at which such offers are being redeemed by others, even in areas in which wireless connectivity is poor or absent. Other embodiments may deliver location-relevant offers to users via adequate wireless connectivity, but with the relevant locations being identified by consumer mobile devices that are or were recently used to redeem an offer nearby. Further, some embodiments may provide these benefits without retail stores incurring the cost of installing wireless beacons to signal when users are near areas where offer the relevant, or such beacons may be supplemented with the present techniques. Embodiments are not limited to systems that provide these benefits, as various engineering and cost trade-offs are envisioned, which is not to suggest that any other feature described herein may not be also omitted in some embodiments.

Figure 13:
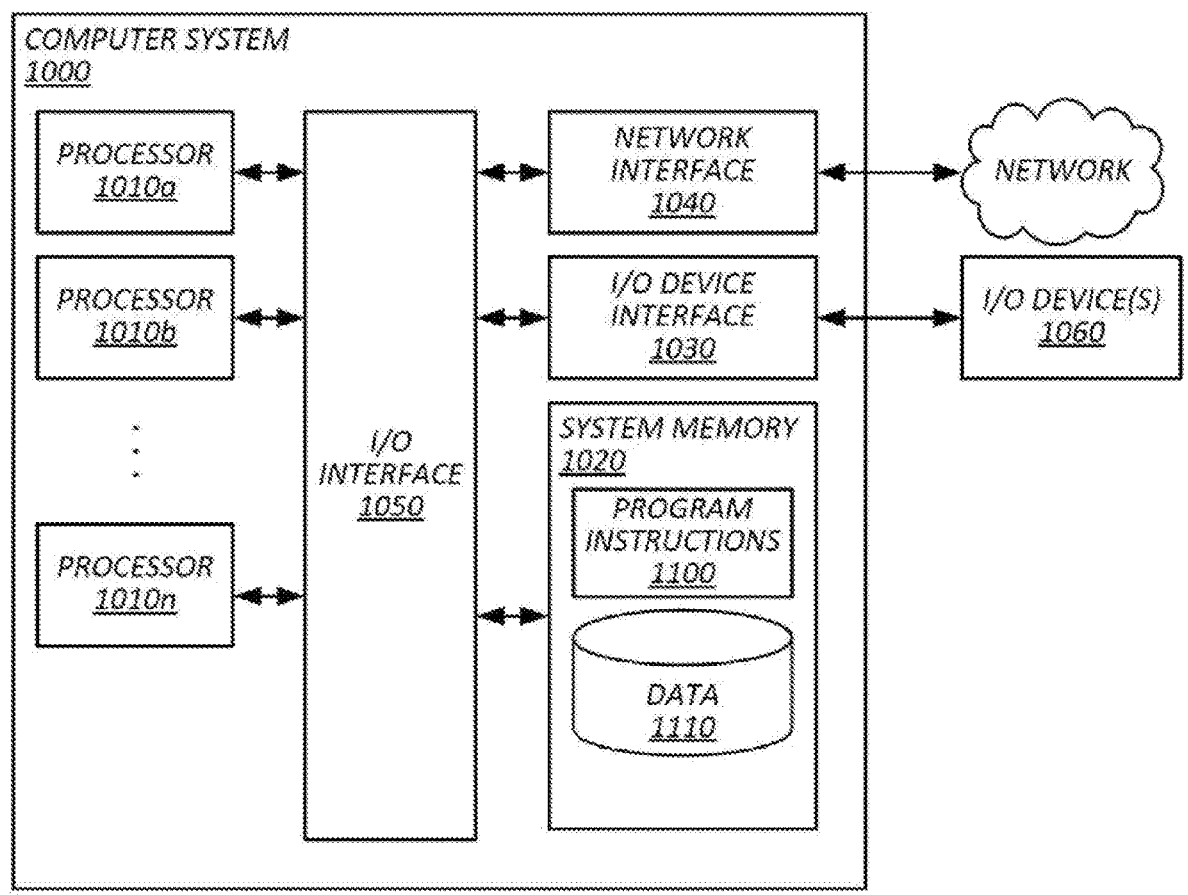
FIG. 13 shows an example of a computer system that may be used to implement some or all of the components described herein.

FIG. 13 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in industry continue as applicants expect. Further, because multiple problems are addressed, it should be understood that some embodiments are problem-specific, and not all embodiments address every problem with traditional systems described herein or provide every benefit described herein. That said, solutions to many of these problems are described above.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patent applications have been incorporated by reference. The text of such materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more mobile computing devices effectuate operations configured to geotarget content in areas having impaired wireless access by establishing peer-to-peer ad hoc networks, the operations comprising: obtaining, in memory of a first mobile computing device, a plurality of content items, at least some of the content items pertaining to respective different geographic areas; receiving, with the first mobile computing device, data indicating a user interaction with a given content item among the plurality of the content items; and in response to receiving the data indicative of the user interaction, transmitting a wireless signal from the first mobile computing device directly to a second mobile computing device that is different from the first mobile computing device, the wireless signal being indicative of the given content item and indicating that the given content item pertains to a given geographic area within range of the wireless signal transmission.

2. The medium of embodiment 1, wherein the operations comprise: receiving, with the first mobile computing device, a request for content, including at least the given content item, from the second mobile computing device, wherein the request for content is transmitted wirelessly directly from the second mobile computing device to the first mobile computing device; and in response to the request for content, transmitting responsive content wirelessly directly from the first mobile computing device to the second mobile computing device.

3. The medium of any of embodiments 1-2, wherein: the responsive content is signed with a cryptographic signature before being obtained by the first mobile computing device by a remote computing device different from both the first mobile computing device and the second mobile computing device; and the cryptographic signature is transmitted by the first mobile computing device to the second mobile computing device.

4. The medium of any of embodiments 1-3, wherein: the wireless signal is a wireless beacon broadcast without regard to whether a receiver is present to receive the wireless signal.

5. The medium of any of embodiments 1-4, wherein the operations comprise: measuring acceleration of the first mobile device with an accelerometer and gyroscope of the first mobile device; estimating a distance moved by the first mobile device after receiving the data indicative of the user interaction based on the measured accelerate adjusting transmission of the wireless signal from the first mobile device based on the estimated distance.

6. The medium of embodiment 5, wherein adjusting transmission comprises ceasing repeated transmissions of the wireless signal upon determining that the distance exceeds a threshold.

7. The medium of embodiment 5, wherein adjusting transmission comprises decreasing transmission power of the wireless signal in response to an increase in the distance.

8. The medium of any of embodiments 1-7, wherein the operations comprise: receiving the wireless signal with the second mobile computing device; retransmitting at least part of data encoded in the wireless signal from the second mobile computing device wirelessly directly to a third mobile computing device; and transmitting from the second mobile computing device wirelessly directly to the third mobile computing device a value indicating that the at least part of the data has been retransmitted at least once.

9. The medium of any of embodiments 1-8, wherein the content items are obtained via a cellular transceiver of the first mobile computing device and the wireless signal is transmitted via a different transceiver of the first mobile computing device.

10. The medium of any of embodiments 1-9, wherein the wireless signal is encoded in a Low Energy Bluetooth beacon.

11. The medium of any of embodiments 1-10, wherein the operations comprise: receiving the wireless signal with the second mobile computing device; obtaining, from a collection of content items including at least some of the plurality of content items, another content item that is different from the given content item, wherein the another content item is selected from the collection of content items based on both information encoded in the wireless signal and a user profile associated with the second mobile computing device.

12. The medium of any of embodiments 1-11, comprising: receiving the wireless signal with a plurality of other mobile computing devices including the second mobile computing device; and in response, emitting an audible alert with at least some of the plurality of other mobile computing devices.

13. The medium of any of embodiments 1-12, wherein: the content items include information about a plurality of businesses, each content item being associated with at least a respective one of the plurality of businesses, and the operations comprise: identifying a given business associated with the given content item; and selecting one or more other content items associated with the given business for presentation on the second mobile device.

14. The medium of embodiment 13, wherein: the wireless signal is indicative of the given content item by identifying a retail store to which the given content item pertains, wherein the plurality of content items include a subset of content items pertaining to the retail store, and the wireless signal is also indicative of the subset of content items.

15. The medium of any of embodiments 1-14, wherein: obtaining a plurality of content items comprises: sending, with the first mobile device, a request for the plurality of content items to a remote offer distribution system, the request identifying an geographic location of the first mobile device; and receiving a plurality of offers selected based on the geographic location; and receiving, with the first mobile computing device, data indicative of a user interaction with the given one of the content items comprises: displaying at least some of the offers with the first mobile device; and receiving a user request to redeem one of the displayed offers with the first mobile device.

16. The medium of any of embodiments 1-15, comprising: detecting, with the first mobile computing device, that the first mobile computing device is within a cache geofence; sending, to a remote server, a request for content corresponding to the cache geofence; receiving, with the first mobile computing device, responsive content including the plurality of content items; and storing, with cache memory of the first mobile computing device, the responsive content before content items among the responsive content are requested by a user of the first mobile computing device.

17. The medium of any of embodiments 1-16, comprising: displaying a plurality of the content items with the first mobile computing device; receiving a user selection to view the given one of the content items; displaying additional information about the given one of the content items; receiving a request to present a machine-readable code with the first mobile computing device to a sensor of another computing device, the request to present the machine-readable code being the received user interaction; and presenting the machine-readable code with the first mobile computing device.

18. The medium of any of embodiments 1-17, comprising: determining that wireless Internet access is unavailable to the first mobile computing device; storing in memory of the first mobile device a log entry indicating that the user requested to present the machine-readable code; after storing the log entry, determining that wireless Internet access is available to the first mobile computing device; in response to determining that wireless Internet access is available, retrieving data indicative of the log entry from memory; and sending the data indicative of the log entry to a remote server.

20. A method, comprising the operations of any of embodiments 1-20.

21. A system, including: one or more processors; and memory storing instructions that when executed by at least some of the processors cause the processors to effectuate the operations of embodiment 1-19.

What is claimed is:

1. A tangible, non-transitory, machine-readable medium storing instructions that when executed by one or more mobile computing devices effectuate operations, the operations comprising:

detecting, with a processor of a first mobile computing device, one or more instances when wireless Internet access on a first wireless connection is impaired based on a threshold time to receive a response to a request transmitted over the first wireless connection being exceeded;

generating, in response to detecting a given instance of the first wireless connection being impaired, a log entry indicative of the given instance of the first wireless connection being impaired and comprising a timestamp and a geolocation of the first mobile computing device;

receiving, from a remote server, when wireless Internet access is available, one or more geofences proximate to a current geolocation of the first mobile computing device, the one or more geofences based on a plurality of logs containing one or more log entries indicative of instances of impaired wireless Internet access corresponding to geolocations associated with geographic areas covered by the respective geofences;

obtaining, in memory of the first mobile computing device, a plurality of content items, at least some of the content items pertaining to respective different geographic areas covered by the respective geofences;

monitoring the current geolocation of the first mobile computing device to determine instances when the current geolocation is within a geographic area covered by a given one of the geofences received by the first mobile device;

displaying, with the first mobile computing device, from among the plurality of the content items obtained in memory, one or more content items pertaining to the geographic area covered by the given one of the geofences received by the first mobile device;

receiving, with the first mobile computing device, data indicating a user interaction with a given one of the displayed content items pertaining to the geographic area covered by the given one of the geofences received by the first mobile device;

establishing, with the first mobile computing device, a peer to peer ad hoc network with at least one other mobile computing device; and in response to receiving the data indicative of the user interaction, transmitting, with the first mobile computing device, a wireless signal from the first mobile computing device directly to a second mobile computing device over the peer to peer ad hoc network, the wireless signal being indicative of the given content item and indicating that the given content item potentially pertains to a given geographic area within range of the wireless signal transmission.

2. The medium of claim 1, wherein the operations comprise:

receiving, with the first mobile computing device, a request for content, including at least the given content item, from the second mobile computing device, wherein the request for content is transmitted wirelessly directly from the second mobile computing device to the first mobile computing device; and in response to the request for content, transmitting responsive content wirelessly directly from the first mobile computing device to the second mobile computing device.

3. The medium of claim 2, wherein:

the responsive content is signed with a cryptographic signature before being obtained by the first mobile computing device by a remote computing device different from both the first mobile computing device and the second mobile computing device; and the cryptographic signature is transmitted by the first mobile computing device to the second mobile computing device.

4. The medium of claim 1, wherein:

the wireless signal is a wireless beacon broadcast without regard to whether a receiver is present to receive the wireless signal.

5. The medium of claim 1, wherein the operations comprise:

measuring acceleration of the first mobile computing device with an accelerometer and gyroscope of the first mobile computing device;

estimating a distance moved by the first mobile computing device after receiving the data indicative of the user interaction based on the measured acceleration; and adjusting transmission of the wireless signal from the first mobile computing device based on the estimated distance.

6. The medium of claim 5, wherein adjusting transmission comprises ceasing repeated transmissions of the wireless signal upon determining that the distance exceeds a threshold.

7. The medium of claim 5, wherein adjusting transmission comprises decreasing transmission power of the wireless signal in response to an increase in the distance.

8. The medium of claim 1, wherein the operations comprise:

receiving the wireless signal with the second mobile computing device;

retransmitting at least part of data encoded in the wireless signal from the second mobile computing device wirelessly directly to a third mobile computing device; and transmitting from the second mobile computing device wirelessly directly to the third mobile computing device a value indicating that the at least part of the data has been retransmitted at least once.

9. The medium of claim 1, wherein the content items are obtained via a cellular transceiver of the first mobile computing device and the wireless signal is transmitted via a different transceiver of the first mobile computing device.

10. The medium of claim 1, wherein the wireless signal is encoded in a Low Energy Bluetooth beacon.

11. The medium of claim 1, wherein the operations comprise:

receiving the wireless signal with the second mobile computing device;

obtaining, from a collection of content items including at least some of the plurality of content items, another content item that is different from the given content item, wherein the another content item is selected from the collection of content items based on both information encoded in the wireless signal and a user profile associated with the second mobile computing device.

12. The medium of claim 1, comprising:

receiving the wireless signal with a plurality of other mobile computing devices including the second mobile computing device; and in response, emitting an audible alert with at least some of the plurality of other mobile computing devices.

13. The medium of claim 1, wherein:

the content items include information about a plurality of businesses, each content item being associated with at least a respective one of the plurality of businesses, and the operations comprise:
   identifying a given business associated with the given content item; and
   selecting one or more other content items associated with the given business for presentation on the second mobile device.

14. The medium of claim 13, wherein:

the wireless signal is indicative of the given content item by identifying a retail store to which the given content item pertains, wherein the plurality of content items include a subset of content items pertaining to the retail store, and the wireless signal is also indicative of the subset of content items.

15. The medium of claim 1, wherein:

obtaining a plurality of content items comprises:
   sending, with the first mobile device, a request for the plurality of content items to a remote offer distribution system, the request identifying an geographic location of the first mobile device; and
   receiving a plurality of offers selected based on the geographic location; and receiving, with the first mobile computing device, data indicative of a user interaction with the given one of the content items comprises:
   displaying at least some of the offers with the first mobile device; and
   receiving a user request to redeem one of the displayed offers with the first mobile device.

16. The medium of claim 1, the operations comprising:

detecting, with the first mobile computing device, that the geographic area covered by the given one of the geofences is a cache geofence;

sending, to a remote server, a request for content corresponding to the cache geofence;

receiving, with the first mobile computing device, responsive content including the plurality of content items; and storing, with cache memory of the first mobile computing device, the responsive content before content items among the responsive content are requested by a user of the first mobile computing device.

17. The medium of claim 1, the operations comprising:

receiving a user selection to view the given one of the content items;

displaying additional information about the given one of the content items;

receiving a request to present a machine-readable code with the first mobile computing device to a sensor of another computing device, the request to present the machine-readable code being the received user interaction; and presenting the machine-readable code with the first mobile computing device.

18. The medium of claim 17, the operations comprising:

after storing the log entry, determining that wireless Internet access is available to the first mobile computing device;

in response to determining that wireless Internet access is available, retrieving data indicative of the log entry from memory; and sending the data indicative of the log entry to a remote server.

19. The medium of claim 1, the operations comprising:

receiving a user request for offers with the first mobile computing device when the first mobile computing device has wireless access to the internet;

sending the request to a remote offer distribution system operative to distribute offers both to mobile devices and to non-mobile devices;

receiving at least some of the requested offers;

displaying at least some of the requested offers to a user of the first mobile computing device; and capturing data indicative of a redemption of at least some of the displayed offers; and sending the captured data to the remote offer distribution system to calculate affiliate compensation.

20. A method, comprising:

detecting, with a processor of a first mobile computing device, one or more instances when wireless Internet access on a first wireless connection is impaired based on a threshold time to receive a response to a request transmitted over the first wireless connection being exceeded;

generating in response to detecting a given instance of the first wireless connection being impaired, a log entry indicative of the given instance of the first wireless connection being impaired and comprising a timestamp and a geolocation of the first mobile computing device;

receiving, from a remote server, when wireless Internet access is available, one or more geofences proximate to a current geolocation of the first mobile computing device, the one or more geofences based on a plurality of logs containing one or more log entries indicative of instances of impaired wireless Internet access corresponding to geolocations associated with geographic areas covered by the respective geofences;

obtaining, in memory of the first mobile computing device, a plurality of content items, at least some of the content items pertaining to respective different geographic areas covered by the respective geofences;

monitoring the current geolocation of the first mobile computing device to determine instances when the current geolocation is within a geographic area covered by a given one of the geofences received by the first mobile device;

displaying, with the first mobile computing device, from among the plurality of the content items obtained in memory, one or more content items pertaining to the geographic area covered by the given one of the geofences received by the first mobile device;

receiving, with the first mobile computing device, data indicating a user interaction with a given one of the displayed content items pertaining to the geographic area covered by the given one of the geofences received by the first mobile device;

establishing, with the first mobile computing device, a peer to peer ad hoc network with at least one other mobile computing device; and in response to receiving the data indicative of the user interaction, transmitting, with the first mobile computing device, a wireless signal from the first mobile computing device directly to a second mobile computing device over the peer to peer ad hoc network, the wireless signal being indicative of the given content item and indicating that the given content item pertains to a given geographic area within the range of the wireless signal transmission.

\* \* \* \* \*